US010697940B2

(12) United States Patent
Nordstrom et al.

(10) Patent No.: US 10,697,940 B2
(45) Date of Patent: Jun. 30, 2020

(54) METHODS AND APPARATUS TO MULTI-PURPOSE AN ACOUSTIC EMISSION SENSOR

(71) Applicant: FISHER CONTROLS INTERNATIONAL LLC, Marshalltown, IA (US)

(72) Inventors: Richard Allen Nordstrom, Marshalltown, IA (US); Shawn Anderson, Haverhill, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 112 days.

(21) Appl. No.: 15/710,546

(22) Filed: Sep. 20, 2017

(65) Prior Publication Data
US 2019/0086311 A1    Mar. 21, 2019

(51) Int. Cl.
*G01N 29/44* (2006.01)
*G01N 29/14* (2006.01)
(Continued)

(52) U.S. Cl.
CPC ........... *G01N 29/4427* (2013.01); *F15C 3/00* (2013.01); *F16K 37/0041* (2013.01);
(Continued)

(58) Field of Classification Search
CPC .......... G10K 11/02; G01H 1/00; G01H 11/08; G01N 29/14; G01N 2291/02836;
(Continued)

(56) References Cited

U.S. PATENT DOCUMENTS 5,154,080 A    10/1992  Hill et al.
6,234,021 B1 *  5/2001  Piety ........................ G01H 1/00
                                                  73/592
(Continued)

FOREIGN PATENT DOCUMENTS

EP    0288979 A2 * 11/1988  ........... F16J 15/3492
JP    H1162846 A    3/1999

OTHER PUBLICATIONS

International Searching Authority, "International Search Report," issued in connection with International Patent Application No. PCT/US2018/048130, dated Dec. 4, 2018, 5 pages.
International Searching Authority, "Written Opinion," issued in connection with International Patent Application No. PCT/US2018/048130, dated Dec. 4, 2018, 6 pages.
(Continued)

*Primary Examiner* — Lisa M Caputo
*Assistant Examiner* — Rose M Miller
(74) *Attorney, Agent, or Firm* — Hanley, Flight & Zimmerman, LLC

(57) ABSTRACT

Methods, apparatus, and articles of manufacture to multi-purpose an acoustic emission sensor are disclosed. An example apparatus includes a collection engine to obtain a measurement from an acoustic emissions sensor coupled to a fluid flow control assembly, and obtain a state of the fluid flow control assembly. The example apparatus further includes a selector to adjust a gain of a pre-amplifier based on the state to adjust the measurement, and a condition identifier to identify a condition of the fluid flow control assembly based on the adjusted measurement.

23 Claims, 10 Drawing Sheets

(51) Int. Cl.
  *G05B 23/02* (2006.01)
  *F16K 37/00* (2006.01)
  *F15C 3/00* (2006.01)
  *G01M 3/24* (2006.01)
  *G01N 11/00* (2006.01)

(52) U.S. Cl.
  CPC ............... *G01N 29/14* (2013.01); *G01M 3/24* (2013.01); *G01N 2011/0073* (2013.01); *G05B 23/0235* (2013.01); *G05B 2219/25428* (2013.01)

(58) Field of Classification Search
  CPC .................. G01N 29/42; G01N 29/449; G01N 2291/0258; H04R 3/04; G01M 13/003; G01M 13/028; G01M 13/045
  USPC .............................................. 73/587, 40.5 A
  See application file for complete search history.

(56) References Cited

U.S. PATENT DOCUMENTS

| | | | |
|---|---|---|---|
| 2005/0257618 A1 | 11/2005 | Boken | |
| 2014/0182381 A1* | 7/2014 | Comeaux | G05B 23/0245 73/587 |
| 2016/0011072 A1* | 1/2016 | Hale | G01M 3/24 702/48 |

OTHER PUBLICATIONS

John M. Rodgers, "The Use of a Floating Threshold for Online Acoustic Emission Monitoring of Fossil High Energy Piping," Acoustic Emission Consulting, Version 1.0, Aug. 1994, 6 pages.
Barat et al., "Detection of AE Signals Against Background Friction Noise," Acoustic Emission Group, 29, 2011, 9 pages.

* cited by examiner

| ACOUSTIC EMISSION (AE) ACTIVE SOURCE | VALVE STATE | COMPETING AE SOURCES | GENERAL AE NOISE ISSUES | SPECIFIC AE NOISE ISSUES |
|---|---|---|---|---|
| LEAK | CLOSED | 1 | PLANT NOISE | |
| OPEN VALVE FLOW | OPEN | 1 | PLANT NOISE | |
| CAVITATION DAMAGE | OPEN | 3 | PLANT NOISE | OPEN VALVE FLOW |
| VALVE DAMAGE | CLOSED | 2 | PLANT NOISE | LEAK |

| FREQUENCY RANGE FOR SIGNAL OUTPUT | SENSOR OUTPUT RANGE (SOR) | SOR IN ACOUSTIC EMISSION (AE) SCALE [dBae] | AE RANGE FOR SEAT LEAKAGE DETECTION 100-800 KILOHERTZ | AE RANGE FOR OPEN FLOW DETECTION 100-800 KILOHERTZ | AE RANGE FOR CAVITATION DETECTION 500-1200 KILOHERTZ |
|---|---|---|---|---|---|
| | 3-10 MICROVOLTS | 10-20 | X | | |
| | 10-100 MICROVOLTS | 20-40 | X | | |
| | 100-1000 MICROVOLTS | 40-60 | X | X | |
| | 1-10 MILLIVOLTS | 60-80 | X | X | |
| | 10-100 MILLIVOLTS | 80-100 | | X | X |
| | 100-1000 MILLIVOLTS | 100-120 | | X | X |
| | 1-10 VOLTS | 120-140 | | X | X |
| | 10-100 VOLTS | 140-160 | | | X |
| | 100-400 VOLTS | 160-172 | | | X |

METHODS AND APPARATUS TO MULTI-PURPOSE AN ACOUSTIC EMISSION SENSOR

FIELD OF THE DISCLOSURE

This disclosure relates generally to process control systems and, more particularly, to methods and apparatus to multi-purpose an acoustic emission sensor.

BACKGROUND

In recent years, process control systems, like those used in chemical, petroleum, and/or other processes, have grown progressively more complex with the proliferation of field devices that include more processing power than their predecessors. Current generation process control systems include a greater number and variety of field devices or instruments for measuring and/or controlling different aspects of a process control environment. In addition to utilizing field devices to monitor and/or control core processes, field devices have been increasingly used for peripheral tasks such as prognostic health monitoring of fluid flow control assemblies such as pumps and valves.

Fluid flow control assemblies within the process control system may be in difficult environments such as areas with extreme vibration, high pressure, and/or wide temperature ranges that may cause accelerated failure. With the implementation of increasingly powerful field devices, process control systems can monitor the prognostic health of the fluid flow control assemblies in these difficult environments using a wide array of sensing devices. Monitoring field devices using the sensing devices coupled with peripheral algorithmic routines can be used to predict potential failures. By predicting potential failures, technicians are empowered to replace potentially faulty fluid flow control assemblies during periodic maintenance as opposed to halting operation of the system to replace the potentially faulty fluid flow control assemblies.

SUMMARY

An example apparatus disclosed herein includes a collection engine to obtain a measurement from an acoustic emissions sensor coupled to a fluid flow control assembly, and obtain a state of the fluid flow control assembly. The example apparatus further includes a selector to adjust a gain of a pre-amplifier based on the state to adjust the measurement, and a condition identifier to identify a condition of the fluid flow control assembly based on the adjusted measurement.

An example method disclosed herein includes obtaining an operational measurement from an acoustic emissions sensor coupled to a fluid flow control assembly, obtaining a state of the fluid flow control assembly, adjusting a gain of a pre-amplifier based on the state to adjust the operational measurement, and identifying a condition of the fluid flow control assembly based on the adjusted operational measurement.

An example non-transitory computer readable storage medium includes instructions which when executed, cause a machine to at least obtain an operational measurement from an acoustic emissions sensor coupled to a fluid flow control assembly, obtain a state of the fluid flow control assembly, adjust a gain of a pre-amplifier based on the state to adjust the operational measurement, and identify a condition of the fluid flow control assembly based on the adjusted operational measurement.

BRIEF DESCRIPTION OF THE DRAWINGS

FIG. 7 is an example table depicting example active acoustic emission sources that may be detected by the example acoustic emission manager apparatus of FIGS. 1-2 in accordance with the teachings of this disclosure.

FIG. 9 is an example table depicting example ranges for fluid flow control assembly condition domains.

Figure 1:
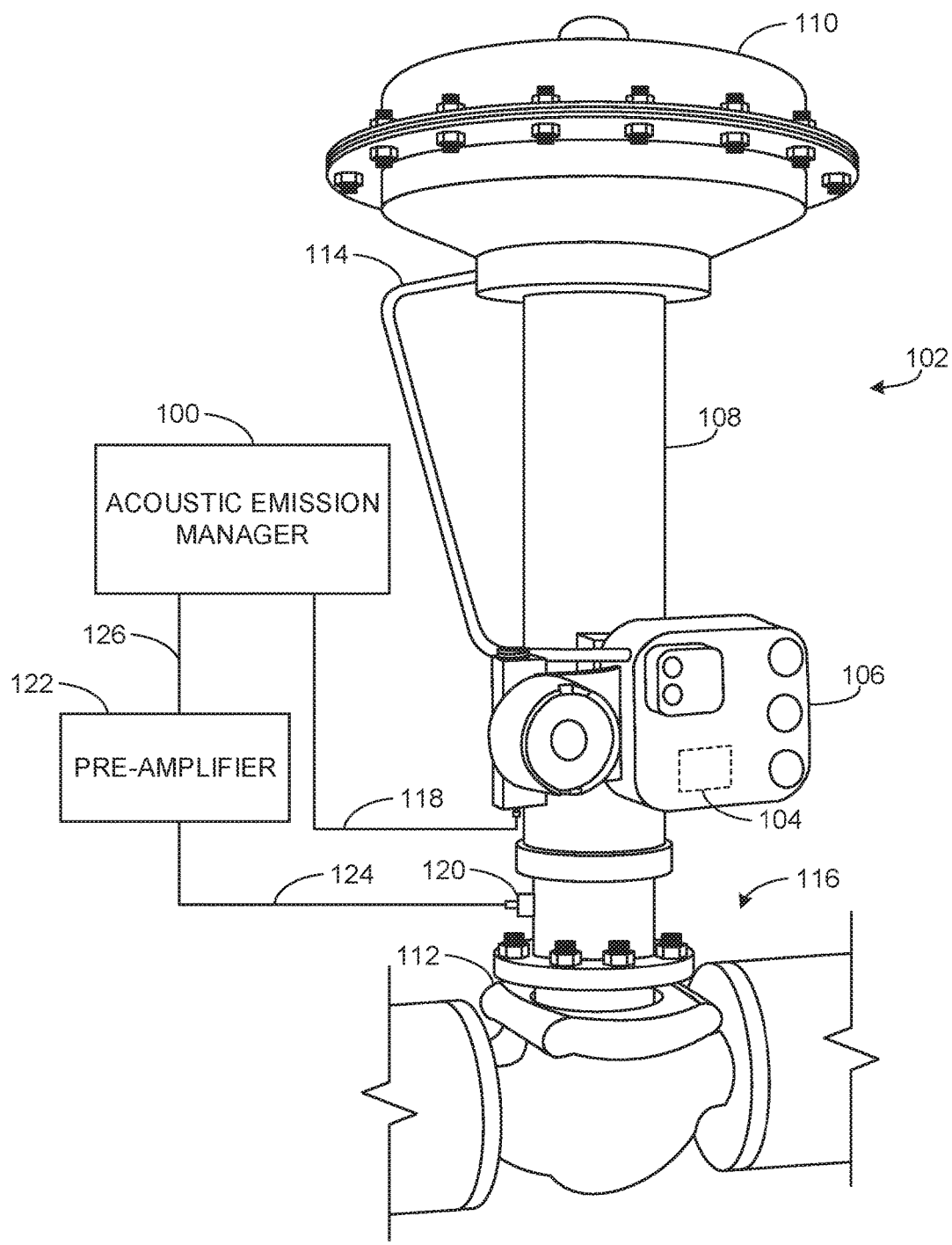
FIG. 1 is a schematic illustration of an example acoustic emission manager apparatus in accordance with the teachings of this disclosure.

Wherever possible, the same reference numbers will be used throughout the drawing(s) and accompanying written description to refer to the same or like parts. As used herein, the terms "coupled" and "operatively coupled" are defined as connected directly or indirectly (e.g., through one or more intervening structures and/or layers).

DETAILED DESCRIPTION

Process control systems are growing increasingly complex as individual components with increased data acquisition resolution, processing power, and signal conditioning are developed. Process control systems are used to monitor and/or to control different aspects of an operation to be conducted in a process control environment such as, for example, manufacturing components, processing raw chemical materials, etc. Process control systems typically contain at least one controller with accompanying inputs and outputs, which allow the controller(s) to acquire signals from various input field devices and/or instruments and control various output field devices and/or instruments.

As used herein, the term "fluid flow control assembly" refers to fluid passage devices such as, for example, pumps (e.g., hydraulic pumps, positive-displacement pumps, etc.), pump assemblies, valves (e.g., hydraulic valves, pneumatic butterfly valves, etc.), valve assemblies, etc., that may be used throughout a process control system to measure and/or control different aspects (e.g., other process control devices) of the process control system. A fluid flow control assembly such as a valve assembly may include both electrical and mechanical components. For example, the valve assembly may include electrical components such as a digital valve positioner, a flow rate sensor, a pressure sensor, a valve controller, etc. The valve assembly may include mechanical components such as an actuator (e.g., a hydraulic actuator, a pneumatic actuator, etc.), a control connection (e.g., a hydraulic control connection, a pneumatic control connection, etc.), a mechanical housing, a process connection, etc.

Fluid flow control assembly failures can result from a multitude of causes such as, for example, continuous operation, environmental factors, manufacturing defects, etc. In some examples, fluid flow control assemblies operate in hi-cycle applications. For example, a valve may continuously conduct a full-stroke operation that includes the valve stroking from fully open to fully closed and from fully closed to fully open. Such full-stroke valves may be designed for extended operating lifecycles. However, the timing of an inevitable failure may not be predictable and may occur during operation. Not knowing when a fluid flow control assembly is expected to fail or about to reach a condition of impending failure poses a significant problem to the continuous operation of existing process control systems. A sudden fluid flow control assembly failure during operation may result in the loss of the fluid flow control assembly and/or equipment connected to the fluid flow control assembly. Fluid flow control assemblies may exhibit non-typical operating conditions such as, for example, cavitation, a leakage of fluids (e.g., valve seat leakage), etc.

As used herein, the term "cavitation" refers to an abrupt condensation and/or vaporization process of a fluid downstream of a fluid flow control assembly (e.g., a modulated valve, a throttled valve, etc.) due to one or more localized low-pressure zones. In some examples, cavities form and explode over lifetimes ranging from approximately 50 microseconds to several milliseconds. In an example cavitation process, when a fluid flows through a process connection (e.g., a pipe, a treating line, a pressure vessel, etc.) a localized low-pressure zone may form immediately upstream of a valve. If the localized low-pressure zone falls below a vapor pressure of the fluid, the fluid vaporizes (i.e., boils) and forms a vapor pocket and subsequently forms one or more vapor bubbles. As the vapor bubbles flow through the valve, the vapor pressure of the fluid may recover, resulting in forceful implosions of the vapor bubbles, thus causing a distinct sound (e.g., a popping sound, a rumbling sound, etc.). Furthermore, the condensation of the vapor bubbles not only produces another distinct sound (e.g., a ringing sound), but also creates stresses on localized areas within a wall of the valve. In addition, the condensation of the vapor bubbles may damage the valve (e.g., causing severe pitting of the valve) or an interior wall of a pipe downstream of the valve when the cavitation occurs near a surface within the valve. Monitoring the valve for cavitation (e.g., a cavitation condition) can provide actionable information for operators of a process control system to stop a condition that induces cavitation or to prevent the cavitation from occurring altogether.

As used herein, the term "seat leakage" refers to an amount of fluid flowing through a fluid flow control assembly when the fluid flow control assembly is set in an off state (e.g., the valve is closed). Seat leakage may occur due to numerous causes. For example, seat leakage may occur when a valve is not fully closed (e.g., due to dirt, debris, obstructions, etc.). In another example, seat leakage may occur when a component of a valve is damaged (e.g., a seal is broken, a seat is damaged, etc.). Monitoring the fluid flow control assembly for seat leakage can provide actionable information for operators of a process control system to replace a component of the fluid flow control assembly prior to (1) additional components becoming damaged, or (2) damaging the fluid flow control assembly to a condition or state beyond repair (e.g., a condition where replacement of the entire fluid flow control assembly is required).

Example acoustic emission manager (AEM) apparatus disclosed herein relate to process control systems and, more specifically, to multi-purposing an acoustic emission sensor. In general, the example AEM apparatus disclosed herein utilizes a controller to obtain information from field devices such as, for example, actuator controllers (e.g., valve controllers), acoustic emission sensors, position sensors (e.g., digital valve positioners, proximity sensors, etc.), process sensors (e.g., flow rate sensors, pressure sensors, etc.), etc.

An acoustic emission (AE) sensor converts a surface movement of a structure caused by an elastic wave into an electrical signal which can be processed by a data acquisition system (e.g., a controller). In some examples, the AE sensor includes a piezoelectric sensing element (e.g., a piezoelectric crystal) to detect the surface movement and convert the surface movement to an electrical signal such as a voltage. Typically, an AE sensor is tailored to a specific monitoring application. The AE sensor may be sensitive to surface movements within a specific frequency band. For example, the AE sensor may have a peak sensitivity ranging from 100-200 kHz to monitor a leak domain (e.g., a frequency band in which seat leakages may be detected), an open flow or an open valve flow domain (e.g., a frequency band in which unobstructed fluid flow through a valve may be detected, an open flow through a valve, etc.), etc., of the fluid flow control assembly. In another example, the AE sensor may have a peak sensitivity ranging from 650-850 kHz to monitor a cavitation domain (e.g., a frequency band in which cavitation may be detected) of the fluid flow control assembly.

In some examples, an AE sensor can be tailored to a specific monitoring application based on an effective range of a preamplifier coupled to the AE sensor. The preamplifier may be internal to the AE sensor or coupled externally to the AE sensor. The preamplifier is used to increase a strength of an input signal (e.g., an AE sensor output) to the preamplifier to increase the strength of the input signal to a level that is optimal for data acquisition measurement circuitry of the example AEM apparatus. For example, the preamplifier may amplify the input signal to minimize an effect of any electromagnetic noise picked up by a cable electrically coupling the AE sensor to the preamplifier. For example, the preamplifier may amplify noise (e.g., background noise, electromagnetic noise, etc.) in the input signal to a level that is optimal for the operation of one or more filters (e.g., band-pass filters, low-pass filters, etc.) electrically coupled to the preamplifier. The preamplifier may implement a linear, voltage amplifier where the gain is calculated as described below in Equation (1):

$$G = \frac{V_0(t, f)}{V_i(t, f)} \qquad \text{Equation (1)}$$

In the example of Equation (1), the variable "$V_0(t, f)$" refers to an output voltage at a time "t" and a frequency "f", the variable "$V_i(t, f)$" refers to an input voltage at the time "t" and the frequency "f", and the variable "G" represents the gain.

In the example of Equation (1), the gain is based on a frequency setting of a filter (e.g., a band-pass filter, a low-pass filter, etc.) as denoted by the frequency "f". For example, a gain may be determined based on a selection of a frequency band (e.g., a band defined by a frequency upper-limit and a frequency lower-limit in the frequency domain) for a band-pass filter. As described in Equation (1), the gain varies with the frequency of an electrical signal (e.g., an AE signal). In some examples, setting or changing a frequency band of a filter is conducted at substantially the same time as setting or changing a gain amplification band. As used herein, the terms "gain" and "gain value" are interchangeable and refer to a ratio of an output voltage to an input voltage at a frequency within a passband (e.g., a range of frequencies that can pass through a filter (e.g., a band-pass filter)). As used herein, the gain includes at least one of an amplification band (e.g., a band defined by a power or a voltage amplification upper-limit and a power or a voltage amplification lower-limit) or a frequency band.

In some examples, a preamplifier is configured to amplify an AE sensor signal with a gain value to monitor a condition domain of interest. For example, the preamplifier may have a peak gain value in a range from 40-80 dB to amplify AE sensor signals to monitor the leak domain of the fluid flow control assembly. In another example, the preamplifier may have a peak gain value in a range from 90-150 dB to amplify the AE sensor signals to monitor the open valve flow domain of the fluid flow control assembly. In yet another example, the preamplifier may have a peak gain value in a range from 100-160 dB to amplify the AE sensor signals to monitor the cavitation domain of the fluid flow control assembly.

In some examples, the peak gains are used to amplify AE sensor signals to produce AE amplitudes. The AE amplitudes may be converted to an AE scale such as $dB_{AE}$. The AE scale represents a logarithmic measure of acoustic emission signal amplitude, referenced to a baseline voltage (e.g., a baseline voltage of 1 picovolt, a baseline voltage of 1 microvolt, etc.) at the pre-amplifier input. In some examples, the baseline voltage is fixed. For example, the AE amplitudes represented in $dB_{AE}$ may be calculated as described below in Equation (2):

$$dB_{AE} = 20 \log\left(\frac{V_{AE}}{1 \ \mu V}\right) \qquad \text{Equation (2)}$$

In the example of Equation (2), the variable "$V_{AE}$" represents an input voltage of the pre-amplifier or the AE amplitude. As used herein, the term "AE amplitude" refers to a maximum measured voltage in a waveform at a specific frequency and is measured in AE decibels ($dB_{AE}$). As demonstrated by the wide varying peak gain ranges used to amplify AE sensor signals to monitor different condition domains (e.g., cavitation domain, leak domain, etc.) of a fluid flow control assembly, multiple AE sensors may be used in parallel to monitor multiple condition domains.

In some examples, a process control system includes multiple AE sensors to monitor multiple condition domains. However, a cost function of a system may increase as additional AE sensors are added. In addition to an increase in a monetary cost of the system, an increase in a technological cost such as increased implementational complexity may be incurred. For example, for each additional AE sensor added to the system, an additional cable, input data acquisition channel, input data acquisition module, pre-amplifier, signal conditioner, etc., may be needed. In another example, additional software development for a controller of the system may be required for each additional AE sensor added. Reduction of sensors and corresponding complexity may be achieved by multi-purposing a sensor.

Example AEM apparatus disclosed herein utilize a multi-source AE sensor with sufficient frequency breadth or bandwidth and dynamic output range coupled with adaptive signal conditioning to detect multiple valve degradation conditions or condition domains. The sensor may be communicatively coupled to a variable pre-amplifier to monitor the multiple condition domains of the fluid flow control assembly. For example, the sensor may have a frequency response range, an electrical output range, etc., to monitor multiple condition domains. As used herein, the term "frequency response" refers to an amplitude and a phase of an electrical output of an AE sensor in response to a stimulus (e.g., a vibration) as a function of frequency. Similarly, the variable pre-amplifier may have a variable gain range, a variable frequency range, etc., to amplify the electrical output of the sensor to a value where multiple condition domains of interest can be monitored. The example AEM apparatus may adjust pre-amplifier information of the variable pre-amplifier to transition between monitoring different condition domains. As used herein, the term "pre-amplifier information" refers to one or more configuration and/or operation parameters of the pre-amplifier such as for example a gain, a type of one or more filters applied (e.g., a low-pass filter, a high-pass filter, a band-pass filter, a band-stop filter, etc.), a setting of the one or more filters applied (e.g., a frequency band (e.g., a frequency passband), an input sensor signal range, a noise rejection level, etc.), etc.

Some example AEM apparatus disclosed herein utilize an example wide band sensor that lacks linear frequency fidelity and which is coupled to a variable pre-amplifier to monitor multiple condition domains of a fluid flow control assembly. In some examples, the AEM apparatus generates and transmits a command to the variable pre-amplifier to adjust a gain of the pre-amplifier. For example, the AEM apparatus may generate a command to adjust the gain of the variable pre-amplifier based on information (e.g., valve state information) obtained from the fluid flow control assembly. In some examples, the information is a state of a valve. For example, the state may include a valve position such as an open percentage, a closed percentage, etc., of the valve. The example AEM apparatus may obtain information from a valve controller, a valve positioner, etc., included in the valve assembly. As a result, the example AEM apparatus may multi-purpose an AE sensor by selecting a gain of the variable pre-amplifier coupled to the AE sensor based on a state of the fluid flow control assembly.

Turning to FIG. 1, an example acoustic emission manager (AEM) 100 disclosed herein operates in a process control environment 102 by obtaining valve state information from a field device 104 (e.g., an electronic valve controller) for a fluid flow control assembly 108. In the illustrated example, the fluid flow control assembly 108 is a pneumatically actuated valve assembly. In the illustrated example, the field device 104 is an electronic valve controller housed in an enclosure 106. The enclosure 106 is coupled to the fluid flow control assembly 108, which includes at least an actuator 110 and a valve 112 (e.g., a butterfly valve, a gate valve, etc.). However, other valve assemblies may additionally or alternatively be utilized, such as an electrically actuated valve assembly, a hydraulically actuated valve assembly, etc. The field device 104 measures one or more parameters of the actuator 110 and/or the valve 112 (e.g., the position of the valve 112) and/or controls the actuator 110 and/or the valve 112. The field device 104 may measure a parameter such as, for example, a valve travel (e.g., a valve position), an actuator pressure, a drive signal, etc. The field device 104 may control the actuator 110 and/or the valve 112 via a parameter such as, for example, a command or an input signal (e.g., a travel set point). The enclosure 106 for the field device 104 includes a connection point for a pneumatic tube connection 114. The field device 104 enables pneumatic control of the actuator 110 via the pneumatic tube connection 114.

In the illustrated example, the fluid flow control assembly 108 is installed in a fluid process system 116 (e.g., a distribution piping system) of a plant environment or a processing system. The fluid process system 116 may be in an environment that exposes the fluid flow control assembly 108 to one or more difficult operating conditions (e.g., extreme vibration, a wide temperature range, etc.), and cause premature failure of the field device 104 and/or the fluid flow control assembly 108 due to accelerated wear. For example, the fluid flow control assembly 108 may be installed downstream of a positive-displacement pump and subject to extreme vibration. Different failure modes of the fluid flow control assembly 108 may occur due to the accelerated wear such as, for example, the actuator 110 having a broken spring, the pneumatic tube connection 114 decoupling and providing insufficient air to the actuator 110, a mechanical obstruction of the valve 112, etc.

In the illustrated example, the field device 104 is communicatively coupled to the AEM 100. Although the field device 104 is depicted in FIG. 1 as communicatively coupled to the example AEM 100 via a cable 118 that includes one or more wires, the field device 104 may additionally or alternatively be connected to the AEM 100 via a wireless connection. For example, the field device 104 may communicate with the AEM 100 via a Bluetooth® connection, a Wi-Fi Direct® network, etc. In some examples, the AEM 100 is a process control system or a part of a process control system (e.g., the AEM 100 is communicatively coupled to a process control system) that includes a controller for data acquisition and/or process control. The example AEM 100 obtains valve state information from the field device 104 during operation (e.g., an operational process) to determine whether the valve 112 is open or closed.

In the illustrated example of FIG. 1, the AEM 100 obtains acoustic emission (AE) information from a sensor 120 coupled to the fluid flow control assembly 108. Alternatively, more than one sensor 120 may be utilized. In the illustrated example, the sensor 120 is a piezoelectric-based AE sensor (e.g., a resonant sensor, etc.). Alternatively, any other AE sensor designed to substantially match (e.g., match within a tolerance) a sensitivity parameter, a noise isolation parameter, and/or one or more frequency characteristics of the piezoelectric-based AE sensor may be used such as a capacitive sensor, an optical sensor (e.g., a laser optical interferometer, etc.), etc. In the illustrated example, the sensor 120 is a low fidelity hybrid broadband-high sensitivity sensor configured to monitor multiple active sources (e.g., cavitation, seat leakage, open flow, etc.). For example, the sensor 120 may respond over a range of electrical noise measured in microvolts to depoling limits measured in hundreds of volts (e.g., approximately 400 volts) dependent on duty cycle. In the illustrated example, the sensor 120 has a frequency response range of 50-950 kHz. Alternatively, the sensor 120 may have a different voltage output range and/or a different frequency response range than described above.

In the illustrated example of FIG. 1, the sensor 120 is coupled to a pre-amplifier 122 via a cable 124. Although the sensor 120 is depicted in FIG. 1 as coupled to the pre-amplifier 122 via the cable 124 that includes one or more wires, the sensor 120 may additionally or alternatively be connected to the pre-amplifier 122 and/or the example AEM 100 via a wireless connection. The example pre-amplifier 122 is a variable pre-amplifier (e.g., a multi-gain amplifier), where one or more characteristics (e.g., a gain, a filter, etc.) of the pre-amplifier may be adjusted.

In the illustrated example, the pre-amplifier 122 includes inputs and outputs. For example, an input to the pre-amplifier 122 may be the sensor 120, a command from the AEM 100, etc. An output from the pre-amplifier 122 may be an amplified electrical signal based on an electrical output from the sensor 120. The pre-amplifier 122 may be powered with an alternating current (AC) or a DC power source from the example AEM 100 or from another external source. The pre-amplifier 122 may power the sensor 120 with an AC power source or a DC power source. For example, the pre-amplifier 122 may power the sensor 120 with a nominal 28 VDC supply. Although the pre-amplifier 122 is depicted in FIG. 1 as being separate from the sensor 120, the pre-amplifier 122 may alternatively be integral to the example AEM 100 or the sensor 120.

In the illustrated example, the sensor 120 becomes a multi-source AE sensor when coupled with the pre-amplifier 122. For example, the sensor 120 may detect multiple degradation conditions based on the pre-amplifier 122 applying a variable gain to the AE sensor information obtained from the sensor 120. In such an example, the variable gain is selected based on the valve state information obtained from the field device 104.

In the illustrated example of FIG. 1, the pre-amplifier 122 is coupled to the AEM 100 via a cable 126. For example, the AEM 100 may be communicatively coupled to the pre-amplifier 122 via an Ethernet connection, a USB connection, etc. Although the pre-amplifier 122 is depicted in FIG. 1 as coupled to the example AEM 100 via the cable 126 that includes one or more wires, the pre-amplifier 122 may additionally or alternatively be connected to the AEM 100 via a wireless connection. For example, the AEM 100 may be communicatively coupled to the pre-amplifier 122 via a Bluetooth® connection, a Wi-Fi® Direct network, etc.

In some examples, the AEM 100 generates and/or transmits a command to the pre-amplifier 122 based on valve state information obtained from the field device 104. For example, the AEM 100 may determine that the valve 112 is substantially open (e.g., 100% open, 100% open within a tolerance of 1%, etc.) or substantially closed (e.g., 100% closed, 100% closed within a tolerance of 1%, etc.) based on obtaining valve state information from the field device 104. In such an example, the AEM 100 may detect an active source such as an open flow and/or cavitation based on the valve 112 being substantially open. The example AEM 100 may generate a command including a desired set point for a gain, a frequency band, etc., of the pre-amplifier 122 based on the valve 112 being substantially open. The example AEM 100 may transmit the command to the pre-amplifier 122. In response to the pre-amplifier 122 receiving the command, the pre-amplifier 122 may adjust a gain, a frequency band of a filter, etc., of the pre-amplifier 122 to the desired set point. Additionally, the pre-amplifier 122 may transmit an acknowledgment or a feedback message to the example AEM 100 indicating a current value and/or current set point of the gain of the pre-amplifier 122.

Figure 2:
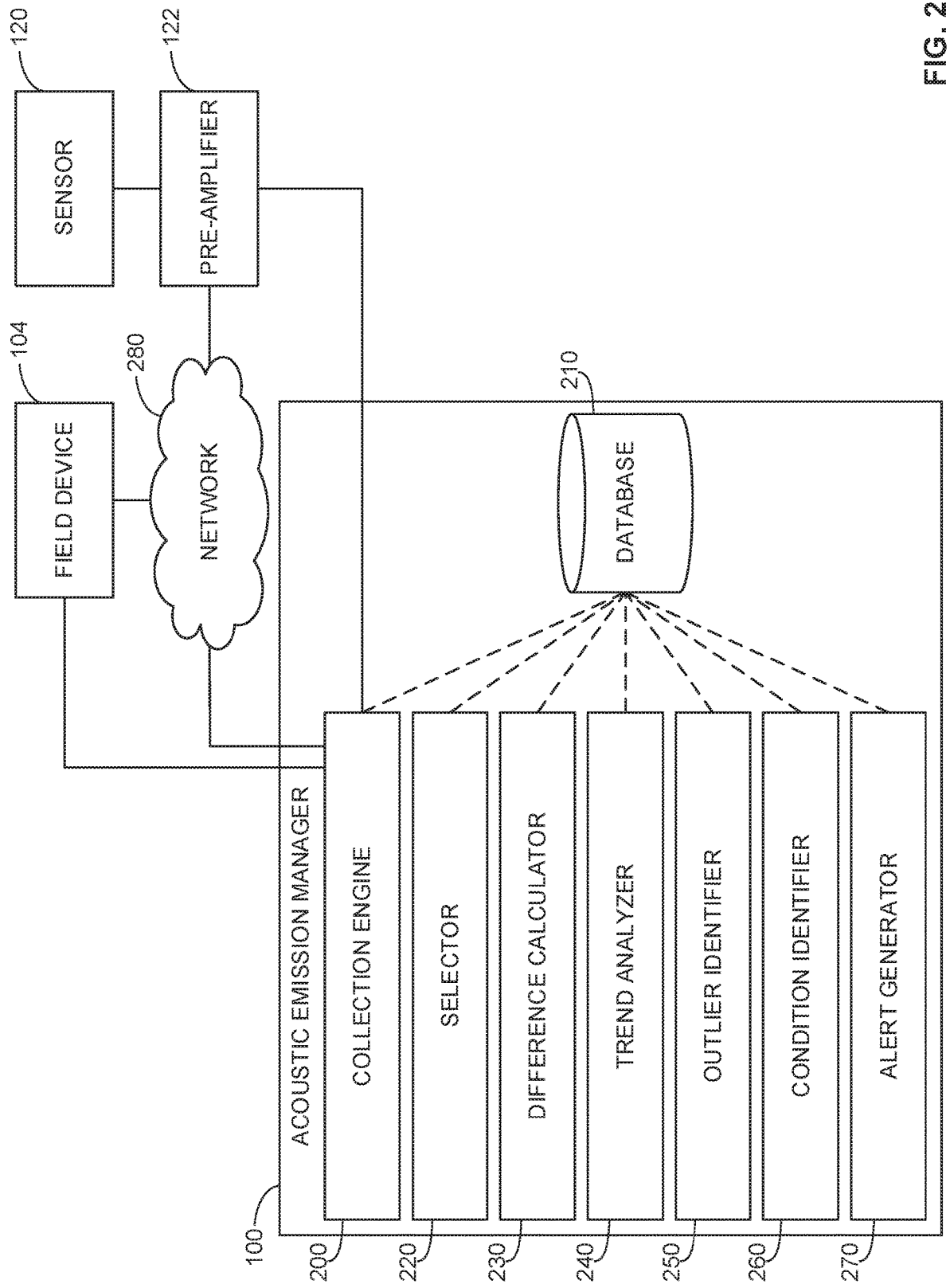
FIG. 2 is a block diagram of an example implementation of the example acoustic emission manager apparatus of FIG. 1.

FIG. 2 is a block diagram of an example implementation of the example AEM 100 of FIG. 1. The example AEM 100 identifies a condition of the fluid flow control assembly 108 of FIG. 1 based on AE sensor information obtained from the sensor 120 and subsequently adjusted by the pre-amplifier 122. The example AEM 100 determines a parameter of the pre-amplifier to adjust the AE sensor information based on obtained valve state information. The example AEM 100 includes an example collection engine 200, an example database 210, an example selector 220, an example difference calculator 230, an example trend analyzer 240, an example outlier identifier 250, an example condition identifier 260, and an example alert generator 270. The example AEM 100 is communicatively coupled to the example pre-amplifier 122 via an example network 280. Additionally or alternatively, the example AEM 100 is communicatively coupled to the pre-amplifier 122 via a direct wired or a direct wireless connection.

In the illustrated example of FIG. 2, the AEM 100 includes the collection engine 200 to select and/or process AE sensor information obtained from an AE sensor. For example, the collection engine 200 may select and/or process AE sensor information (e.g., AE information captured by the sensor 120) obtained from the pre-amplifier 122 via the network 280, and/or from the pre-amplifier 122 via a direct wired or a direct wireless connection. The collection engine 200 may select obtained AE sensor information of interest to be used by one or more algorithms, processes, programs, etc., of the example AEM 100. Selected AE sensor information may include, for example, an analog electrical signal, a digital electrical signal, etc., amplified by the pre-amplifier 122. The collection engine 200 may process the AE sensor information by converting (e.g., converting using a conversion calculation, converting to different units of measure, etc.), scaling (e.g., scaling using a scaling factor), and/or translating (e.g., translating using a sensitivity curve) the electrical output from the pre-amplifier 122 to a measure of surface movement (e.g., a frequency response, a voltage amplitude, etc.) that may be used by the example AEM 100.

In some examples, the collection engine 200 processes AE sensor information using a floating threshold to adjust AE sensor information against a background noise level in the AE sensor information. For example, the collection engine 200 may use a floating threshold to adjust, clean-up, etc., AE sensor information obtained from the sensor 120 when the valve 112 of FIG. 1 or a mechanical structure (e.g., a pipe, a treating line connection, etc.) downstream of the valve 112 is exhibiting a cavitation condition. In prior examples, AE data acquisition and processing systems use a fixed threshold on an AE data acquisition channel based on a noise profile observed during a calibration or a setup data acquisition period. However, prior examples can produce inaccurate AE measurement results by using a fixed threshold. For example, noise profiles included in AE sensor information may vary with different flow and valve throttling conditions and may lead to saturation on one or more data acquisition channels based on setting a fixed threshold too low, insensitivity to detecting and locating valid acoustic emissions during periods of low noise based on setting a fixed threshold too high, etc.

In some examples, the collection engine 200 processes the AE sensor information by dynamically measuring and calculating an average signal level (ASL) (e.g., an ASL in root mean square millivolts) based on the AE sensor information (e.g., the AE sensor information obtained on one or more data acquisition channels of the collection engine 200 from the AE sensor 120). In such examples, the collection engine 200 adds the ASL to a fixed threshold to generate a floating threshold. For example, the collection engine 200 may generate a floating threshold of 1.3 volts based on a calculated ASL of 1.0 volts and a fixed threshold of 0.3 volts (e.g., 1.3 volts=1.0 volts+0.3 volts).

In some examples, the collection engine 200 obtains baseline AE sensor information, baseline adjusted AE sensor information, baseline measurements, etc. As used herein, the terms "baseline AE sensor information," "baseline sensor measurements," or "baseline measurements" refer to AE sensor data obtained from the sensor 120 of FIGS. 1-2 during a calibration process (e.g., a commissioning process, an install process, an acceptance test, etc.) corresponding to a valve action (e.g., an opening or a closing of the valve 112 of FIG. 1), and are thus used interchangeably. As used herein, the terms "baseline adjusted AE sensor information" or "baseline adjusted sensor measurements" refer to AE sensor data obtained from the sensor 120 and then amplified by the pre-amplifier 122 of FIGS. 1-2 during a calibration process corresponding to a valve action, and are thus used interchangeably.

In some examples, the collection engine 200 obtains operational AE sensor information, operational adjusted AE sensor information, operational measurements, etc. As used herein, the term "operational AE sensor information," "operational sensor measurements," or "operational measurements" refer to AE sensor data obtained from the sensor 120 during a typical valve operation under normal operating conditions, and are thus used interchangeably. As used herein, the terms "operational adjusted AE sensor information" and "operational adjusted sensor measurements" refer to AE sensor data obtained from the sensor 120 and then amplified by the pre-amplifier 122 during a typical valve operation under normal operating conditions, and are thus used interchangeably.

In some examples, the collection engine 200 processes the AE sensor information by applying or performing a frequency analysis operation such as a Fast Fourier Transform (FFT), a spectral density (e.g., an energy spectral density, a power spectral density, etc.) calculation, etc., and/or a combination thereof to produce frequency information or AE frequency information. For example, the collection engine 200 may apply an energy spectral density calculation to obtained AE sensor information to produce AE frequency information corresponding to energy present in the sensor information as a function of frequency, per unit frequency. In another example, the collection engine 200 may apply a power spectral density calculation to obtained AE sensor information to produce AE frequency information corresponding to power present in the sensor information as a function of frequency, per unit frequency. In some instances, the collection engine 200 applies one or more filters (e.g., a low-pass filter, a high-pass filter, a band-pass filter, a band-stop filter, etc.) to the AE sensor information prior to and/or after performing the frequency analysis operation.

In some examples, the collection engine 200 calculates baseline AE frequency information and operational AE frequency information. As used herein, the term "baseline AE frequency information" refers to AE sensor data captured during a calibration corresponding to a valve action as a function of frequency, where the AE sensor data is obtained from the pre-amplifier 122. As used herein, the term "operational AE frequency information" refers to AE sensor data captured during a typical valve operation under normal operating conditions as a function of frequency, where the AE sensor data is obtained from the pre-amplifier 122.

In some examples, the collection engine 200 selects and/or processes valve state information obtained from the fluid flow control assembly 108. For example, the collection engine 200 may select and/or process valve state information obtained from the field device 104 via the network 280, and/or from the field device 104 via a direct wired or a direct wireless connection. The collection engine 200 may select and/or process obtained valve state information of interest as described above in connection with the obtained AE sensor information. In some examples, the collection engine 200 stores the AE sensor information, the valve state information, the baseline or operational AE frequency information, etc., in the database 210. In some instances, the collection engine 200 retrieves the AE sensor information, the valve state information, a fixed threshold, a parameter (e.g., a gain, a frequency band of a filter, etc.) of the pre-amplifier 122, etc., from the database 210.

In the illustrated example of FIG. 2, the AEM 100 includes the database 210 to record data (e.g., AE sensor information, valve state information, pre-amplifier information (e.g., a current gain value, a current gain set point, etc.), etc.). In some examples, the database 210 records a flag (e.g., a flag in computer and/or machine readable instructions) and/or a variable associated with the obtained data. For example, the AEM 100 may set a valve state flag for the valve 112 to indicate that the valve 112 is open and store the valve state flag in the database 210. The example database 210 may respond to queries for information related to data in the database 210. For example, the database 210 may respond to queries for additional data by providing the additional data (e.g., the one or more data points), by providing an index associated with the additional data in the database 210, etc. The example database 210 may additionally or alternatively respond to queries when there is no additional data in the database 210 by providing a null index, an end of database 210 identifier, etc.

The example database 210 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The example database 210 may additionally or alternatively be implemented by one or more double data rate (DDR) memories, such as DDR, DDR2, DDR3, DDR4, mobile DDR (mDDR), etc. The example database 210 may additionally or alternatively be implemented by one or more mass storage devices such as hard disk drive(s), compact disk drive(s) digital versatile disk drive(s), solid-state drive(s), etc. While in the illustrated example the database 210 is illustrated as a single database, the database 210 may be implemented by any number and/or type(s) of databases. Although the example database 210 is depicted in FIG. 2 as being included in the example AEM 100, alternatively the database 210 may be separate from the AEM 100.

In the illustrated example of FIG. 2, the AEM 100 includes the selector 220 to determine a parameter of the pre-amplifier 122. In some examples, the selector 220 determines a parameter of the pre-amplifier 122 based on a valve position of the fluid flow control assembly 108. For example, the selector 220 may determine a first gain value (e.g., an open valve gain value, a closed valve gain value, etc.) including a first frequency band of a band-pass filter based on determining that the fluid flow control assembly 108 is substantially open based on the valve position. In another example, the selector 220 may determine a second gain value (e.g., a closed valve gain value) including a second frequency band of the band-pass filter based on determining that the fluid flow control assembly 108 is substantially closed based on the valve position. In some examples, the first and the second gain values are different. In some examples, the selector 220 determines the first and the second gain values based on querying a look-up table in the database 210. For example, the selector 220 may map a condition of the valve 112 being substantially open to an open valve gain value in a look-up table in the database 210.

In some examples, the selector 220 determines that the valve 112 is substantially open or substantially closed based on a value of the valve state flag, where the value of the valve state flag is retrieved from the database 210 by the selector 220. In some examples, the selector 220 generates and/or transmits a command to the pre-amplifier 122 to adjust a parameter of the pre-amplifier 122. For example, the selector 220 may generate and transmit a command to the pre-amplifier 122 to adjust a current gain value of the pre-amplifier 122 to the open valve gain value, the closed valve gain value, etc.

In some examples, the selector 220 determines a configuration and/or a setting of a filter to be applied by the pre-amplifier 122 of FIGS. 1-2 to AE sensor information obtained from the sensor 120 of FIG. 1. For example, the selector 220 may determine a type of one or more filters applied (e.g., a low-pass filter, a high-pass filter, a band-pass filter, a band-stop filter, etc.), a setting of the one or more filters applied (e.g., a frequency band, an input sensor signal range, a noise rejection level, etc.), etc., to the AE sensor information. In some instances, the selector 220 determines a type and/or a setting of the one or more filters to be applied to AE sensor information based on a condition of the fluid flow control assembly 108 of interest, obtained valve state information, etc. For example, the selector 220 may determine that the valve 112 is substantially open based on the obtained valve state information. In response to the valve 112 being substantially open, the selector 220 may apply a band-pass filter to remove operational AE frequency information outside of a frequency range of 100-680 kHz to monitor for an open valve flow condition.

In the illustrated example of FIG. 2, the AEM 100 includes the difference calculator 230 to calculate a difference between operational and baseline AE sensor information. For example, the difference calculator 230 may calculate a difference between operational adjusted AE sensor information and baseline adjusted AE sensor information and determine whether the difference satisfies a threshold (e.g., a difference threshold, a ratio threshold, a voltage amplitude threshold, etc.). For example, the difference calculator 230 may calculate a difference between (1) a voltage amplitude of a first output of the pre-amplifier 122 of FIGS. 1-2 captured during an operational process when the valve 112 is substantially open and (2) a voltage amplitude of a second output of the pre-amplifier 122 captured during a baseline process when the valve 112 was substantially open. The difference calculator 230 may determine whether the difference in the voltage amplitudes satisfies a voltage amplitude threshold (e.g., a difference greater than 0.5 V).

In some examples, the difference calculator 230 calculates a difference between first operational adjusted AE sensor information and second operational adjusted AE sensor information and determines whether the difference satisfies a threshold. For example, the difference calculator 230 may calculate a difference between (1) a first voltage amplitude of a first output of the pre-amplifier 122 captured during a first operational process and (2) a second voltage amplitude of a second output of the pre-amplifier 122 captured during a second operational process, where the second operational process is completed after the first. In such an example, the difference calculator 230 may compare the difference to a voltage amplitude threshold, and determine whether the difference satisfies the voltage amplitude threshold based on the comparison.

In some instances, the difference calculator 230 calculates a difference between first baseline adjusted AE sensor information and second baseline adjusted AE sensor information and determines whether the difference satisfies a threshold. For example, the difference calculator 230 may calculate a difference between (1) a first voltage amplitude of a first output of the pre-amplifier 122 captured during a first baseline process and (2) a second voltage amplitude of a second output of the pre-amplifier 122 captured during a second baseline process, where the second baseline process is completed after the first. In such an example, the difference calculator 230 may compare the difference to a voltage amplitude threshold, and determine whether the difference satisfies the voltage amplitude threshold based on the comparison.

In some examples, the difference calculator 230 calculates a ratio between operational AE frequency information and baseline AE frequency information, and determines whether the ratio satisfies a threshold. For example, the difference calculator 230 may calculate a ratio between (1) an amplitude of a power spectral peak at a frequency captured during an operational process and (2) an amplitude of a power spectral peak at the frequency captured during a baseline process. The difference calculator 230 may compare the ratio to a ratio threshold, and determine whether the ratio in the power spectral peak amplitudes satisfies the ratio threshold (e.g., a ratio greater than 5 dB, 10 dB, etc.). For example, the difference calculator 230 may calculate a ratio of 10 dB, compare the ratio of 10 dB to a ratio threshold of 5 dB or greater, and determine that the calculated ratio of 10 dB satisfies the ratio threshold of 5 dB or greater.

In another example, the difference calculator 230 may determine whether an amplitude of a power spectral peak satisfies a threshold (e.g., an amplitude of a power spectral peak is greater than 80 dB, 90 dB, etc.). In some examples, the difference calculator 230 stores information (e.g., a calculated difference) in the database 210. In some instances, the difference calculator 230 retrieves information such as adjusted AE sensor information, baseline AE sensor information, operational AE frequency information, baseline AE frequency information, a threshold, etc., from the database 210.

In the illustrated example of FIG. 2, the AEM 100 includes the trend analyzer 240 to select, compare, and analyze trends of AE sensor information and/or AE frequency information. In some examples, the trend analyzer 240 selects and analyzes AE sensor information and/or AE frequency information of interest obtained during a first time period (e.g., during a baseline process of the fluid flow control assembly 108). For example, the trend analyzer 240 may calculate a mean, a standard deviation, etc., of voltage amplitudes, power spectral peak amplitudes, etc., for a selected set of AE sensor information and/or AE frequency information during the first time period. The trend analyzer 240 may compare the AE sensor information and/or the AE frequency information obtained during the first time period to AE sensor information and/or AE frequency information obtained during a second time period (e.g., during an operational process of the fluid flow control assembly 108). For example, the trend analyzer 240 may calculate a mean, a standard deviation, etc., of voltage amplitudes, power spectral peak amplitudes, etc., for a selected set of AE sensor information and/or AE frequency information during the second time period. The trend analyzer 240 may identify trend information (e.g., a downward trend, an upward trend, etc.) based on the AE sensor information, the AE frequency information, etc., corresponding to the fluid flow control assembly 108.

In some examples, the trend analyzer 240 determines that the trend information indicates a condition of the fluid flow control assembly 108. For example, an upward trend of voltage amplitudes over time may indicate cavitation is occurring or that the fluid flow control assembly 108 is operating in the cavitation condition domain. In another example, an upward trend of voltage amplitudes over time may indicate replacement damage (e.g., an amount of sustained damage necessitating replacement, etc.). In some examples, the trend analyzer 240 may produce a graph or a plot based on the trend information. For example, the trend analyzer 240 may produce a plot depicting average values for the voltage amplitudes, the frequency responses, etc., as a function of time. In some examples, the trend analyzer 240 stores the trend information in the database 210. In some instances, the trend analyzer 240 retrieves the AE sensor information, the AE frequency information, etc., from the database 210.

In the illustrated example of FIG. 2, the AEM 100 includes the outlier identifier 250 to select a value (e.g., a data point) of interest within selected AE sensor information (e.g., baseline AE sensor information, operational AE sensor information, etc.), selected AE frequency information (e.g., baseline AE frequency information, operational AE frequency information, etc.), etc., and determine whether the value of interest is an outlier. In some examples, the outlier identifier 250 calculates at least a mean value and a standard deviation value for data in the selected AE sensor information, the selected AE frequency information, etc. For example, the outlier identifier 250 may calculate a mean value and a standard deviation value for voltage amplitudes included in the selected AE sensor information, for power spectral peak amplitudes included in the selected AE frequency information, etc. In some instances, the outlier identifier 250 determines a difference between the mean value and a data point of interest in the selected AE sensor information during a time period. The outlier identifier 250 may determine that the data point of interest is an outlier value when the difference satisfies a threshold (e.g., the difference exceeds one or more standard deviation values, etc.). In some instances, the outlier identifier 250 removes the identified outlier value from the AE sensor information, the AE frequency information, etc. In some examples, the outlier identifier 250 stores the mean value, the standard deviation value, the outlier value, etc., in the database 210. For example, the outlier identifier 250 may store the outlier value in the database 210 for further analysis, for generating an alert, etc. In some instances, the outlier identifier 250 retrieves the data point of interest, the mean value, the standard deviation value, etc., from the database 210.

In the illustrated example of FIG. 2, the AEM 100 includes the condition identifier 260 to identify a condition of the fluid flow control assembly 108. For example, the condition identifier 260 may determine that the fluid flow control assembly 108 is exhibiting a cavitation condition, an open flow or an open valve flow condition, a seat leakage condition, etc., based on AE sensor information, AE frequency information, valve state information, etc. The AE sensor information may include analog signal data such as a voltage amplitude obtained from the pre-amplifier 122. The AE frequency information may include FFT data, energy spectral density data, power spectral density data, etc., where the AE frequency information includes amplitudes as a function of frequency, per unit frequency. The valve state information may include a state of the valve 112 obtained from the field device 104. The state of the valve 112 may include a valve position percentage (e.g., 100% closed, 100% open, etc.), an identifier indicating that the valve 112 is substantially open or substantially closed, etc.

For example, the condition identifier 260 may identify a seat leakage condition of the fluid flow control assembly 108 based on (1) the valve 112 being substantially closed and (2) a voltage amplitude output obtained from the pre-amplifier 122 satisfying a threshold (e.g., a voltage amplitude greater than 0.5 V, 1.0 V, 1.5 V, etc.). In another example, the condition identifier 260 may identify a cavitation condition based on (1) the valve 112 being substantially open and (2) a sensor output obtained from the pre-amplifier 122 satisfying a threshold (e.g., a sensor output greater than 80 $dB_{AE}$, 90 $dB_{AE}$, etc.). In yet another example, the condition identifier 260 may identify an open valve flow condition of the fluid flow control assembly 108 based on (1) the valve 112 being substantially open and (2) a difference between amplitudes of power spectral peaks at a frequency satisfying a threshold. For example, the difference may be between (1) an amplitude of a power spectral peak at a frequency captured during an operational process and (2) an amplitude of a power spectral peak at the frequency captured during a baseline process. In some examples, the condition identifier 260 stores the condition of the fluid flow control assembly 108 in the database 210. In some instances, the condition identifier 260 retrieves the AE sensor information of interest, the AE frequency information of interest, the valve state information of interest, a calculated difference, etc., from the database 210.

In the illustrated example of FIG. 2, the AEM 100 includes the alert generator 270 to generate an alert based on a change in a condition of the fluid flow control assembly 108. For example, the alert generator 270 may generate an alert when the fluid flow control assembly 108 is exhibiting a cavitation condition, an open valve flow condition, a seat leakage condition, etc. In some examples, the alert generator 270 generates the alert when a difference between adjusted AE sensor information and baseline AE sensor information satisfies a threshold. In other examples, the alert generator 270 generates the alert when a difference between operational AE frequency information and baseline AE frequency information satisfies a threshold. In some instances, the alert generator 270 generates the alert when trend information indicates that the condition of the fluid flow control assembly 108 may change. In response to identifying the condition or a pending change in the condition of the fluid flow control assembly 108, the example alert generator 270 may generate an alert such as, for example, sounding an alarm, propagating an alert message throughout a process control network, generating a failure log and/or a report, displaying the alert on a display, generating a maintenance task list (e.g., a list of valves that may need to be replaced, etc.), etc. In some instances, the alert generator 270 generates an alert based on identifying an outlier.

In some examples, the alert generator 270 generates a threshold (e.g., adjust an existing threshold, create a new threshold, etc.) based on current and/or past AE adjusted sensor information, current and/or past AE frequency information, etc., corresponding to the fluid flow control assembly 108. For example, the alert generator 270 may modify an existing threshold (e.g., a default threshold) for a voltage amplitude output from the pre-amplifier 122 based on the most recently calculated voltage amplitude output from the pre-amplifier 122. Alternatively, the alert generator 270 may generate the threshold based on current and/or past AE adjusted sensor information, current and/or past AE frequency information, etc., obtained from a second pre-amplifier coupled to a second sensor monitoring a second valve. The second valve may be coupled to the fluid process system 116 of FIG. 1 via process piping. Alternatively, the second valve may be coupled to a different fluid process system than the fluid process system 116. The alert generator 270 may modify the existing threshold for the voltage amplitude output from the pre-amplifier 122 based on an obtained voltage amplitude output from the second preamplifier. Additionally or alternatively, the alert generator 270 may modify an existing threshold corresponding to AE frequency information of the fluid flow control assembly 108 based on AE frequency information corresponding to the second valve.

In some examples, the alert generator 270 employs a pre-defined threshold that may be dependent on a default threshold value or user input. In some examples, the alert generator 270 utilizes a calculated threshold. For example, the alert generator 270 may base the calculated threshold on one or more standard deviation values. In some instances, the alert generator 270 stores the threshold and/or the generated alert in the database 210. In some instances, the alert generator 270 retrieves the threshold and/or the generated alert from the database 210.

In the illustrated example of FIG. 2, the network 280 is a bus and/or a computer network. For example, the network 280 may be an internal controller bus, a process control network, a direct wired or a direct wireless connection to the field device 104 or an interface of the field device 104, etc. In some examples, the network 280 is a network with the capability of being communicatively coupled to the Internet. However, the network 280 may be implemented using any suitable wired and/or wireless network(s) including, for example, one or more data buses, one or more Local Area Networks (LANs), one or more wireless LANs, one or more cellular networks, one or more fiber optic networks, one or more satellite networks, one or more private networks, one or more public networks, etc. The network 280 may enable the example AEM 100 to be in communication with the field device 104, the pre-amplifier 122, etc. As used herein, the phrase "in communication," including variances thereof, encompasses direct communication and/or indirect communication through one or more intermediary components and does not require direct physical (e.g., wired) communication and/or constant communication, but rather includes selective communication at periodic or aperiodic intervals, as well as one-time events.

While an example manner of implementing the AEM 100 of FIG. 1 is illustrated in FIG. 2, one or more of the elements, processes and/or devices illustrated in FIG. 2 may be combined, divided, re-arranged, omitted, eliminated, and/or implemented in any other way. Further, the example collection engine 200, the example database 210, the example selector 220, the example difference calculator 230, the example trend analyzer 240, the example outlier identifier 250, the example condition identifier 260, the example alert generator 270, and/or, more generally, the example AEM 100 of FIG. 2 may be implemented by hardware, software, firmware, and/or any combination of hardware, software, and/or firmware. Thus, for example, any of the example collection engine 200, the example database 210, the example selector 220, the example difference calculator 230, the example trend analyzer 240, the example outlier identifier 250, the example condition identifier 260, the example alert generator 270, and/or, more generally, the example AEM 100 of FIG. 2 could be implemented by one or more analog or digital circuit(s), logic circuits, programmable processor(s), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example collection engine 200, the example database 210, the example selector 220, the example difference calculator 230, the example trend analyzer 240, the example outlier identifier 250, the example condition identifier 260, the example alert generator 270, and/or, more generally, the example AEM 100 of FIG. 2 is/are hereby expressly defined to include a non-transitory computer readable storage device or storage disk such as a memory, a digital versatile disk (DVD), a compact disk (CD), a Blu-ray disk, etc., including the software and/or firmware. Further still, the example AEM 100 of FIG. 2 may include one or more elements, processes, and/or devices in addition to, or instead of, those illustrated in FIG. 2, and/or may include more than one of any or all of the illustrated elements, processes, and devices.

Flowcharts representative of example methods for implementing the example AEM 100 of FIG. 2 are shown in FIGS. 3-6. In these examples, the methods may be implemented using machine readable instructions that comprise a program for execution by a processor such as the processor 1012 shown in the example processor platform 1000 discussed below in connection with FIG. 10. The program may be embodied in software stored on a non-transitory computer readable storage medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowcharts illustrated in FIGS. 3-6, many other methods of implementing the example AEM 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

Figure 3:
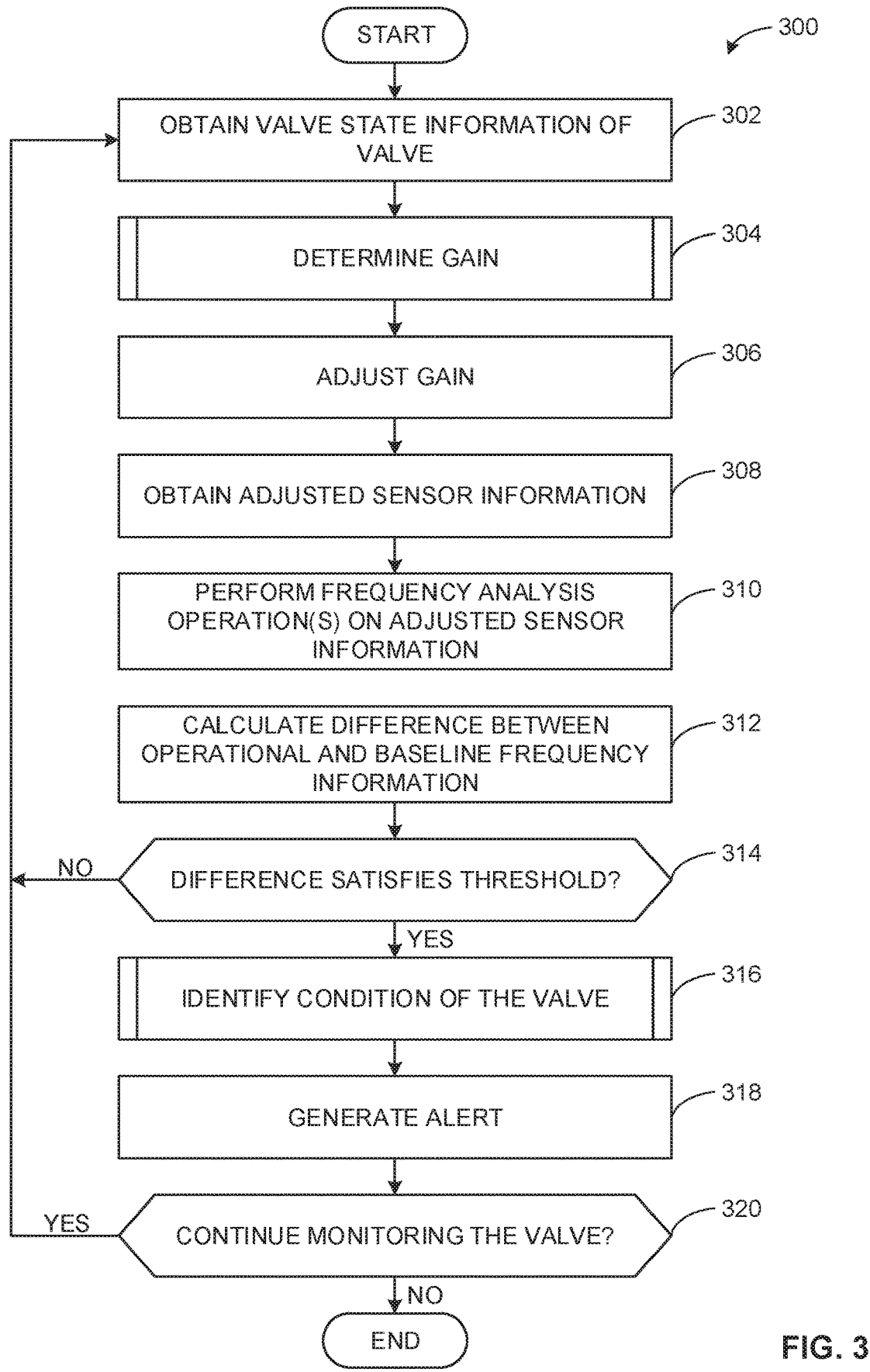
FIGS. 3-6 are flowcharts representative of example methods that may be performed using the example acoustic emission manager apparatus of FIGS. 1-2 to monitor acoustic emissions from a fluid flow control assembly.

As mentioned above, the example methods of FIGS. 3-6 may be implemented using coded instructions (e.g., computer and/or machine readable instructions) stored on a non-transitory computer readable and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open ended in the same manner as the term "comprising" and "including" are open ended.

computer readablecomputer readablecomputer readable FIG. 3 is a flowchart representative of an example method 300 that may be performed by the example AEM 100 of FIGS. 1-2 to identify a condition of a fluid flow control assembly based on obtained AE sensor information and obtained valve state information. The example method 300 begins at block 302 when the example AEM 100 obtains valve state information of a valve. For example, the collection engine 200 may obtain a valve position percentage of the fluid flow control assembly 108 of FIG. 1 (e.g., the valve is 100% open) from the fluid flow control assembly 108 via the field device 104 of FIG. 1 and/or the network 280 of FIG. 2.

At block 304, the example AEM 100 determines a gain. For example, the selector 220 may determine a gain of the pre-amplifier 122 of FIGS. 1-2. The selector 220 may determine the gain based on the valve state information of the fluid flow control assembly 108. At block 306, the example AEM 100 adjusts a gain. For example, the selector 220 may adjust the gain of the pre-amplifier 122 by generating a command (e.g., an adjust gain command) and transmitting the command to the pre-amplifier 122 to adjust the gain of the pre-amplifier 122.

At block 308, the example AEM 100 obtains adjusted sensor information. For example, the collection engine 200 may obtain adjusted AE sensor information from the pre-amplifier 122 and/or from the pre-amplifier 122 via the network 280. For example, the pre-amplifier 122 may output adjusted AE sensor information by amplifying the obtained AE sensor information from the sensor 120 of FIGS. 1-2 by the adjusted gain. At block 310, the example AEM 100 performs frequency analysis operation(s) on the adjusted AE sensor information. For example, the collection engine 200 may perform an FFT calculation, a power spectral density calculation, etc., and/or a combination thereof to generate AE frequency information.

At block 312, the example AEM 100 calculates a difference between operational frequency information and baseline frequency information. For example, the difference calculator 230 may calculate a difference between (1) an amplitude of a power spectral peak at a frequency captured during an operational process and (2) an amplitude of a power spectral peak at the frequency captured during a baseline process. Alternatively, the example AEM 100 may calculate a difference between adjusted AE sensor information and baseline AE sensor information. For example, the difference calculator 230 may calculate a difference between a (1) voltage amplitude at a valve position of the valve 112 of FIG. 1 captured during an operational process and (2) a voltage amplitude at the valve position captured during a baseline process.

At block 314, the example AEM 100 determines whether the difference satisfies a threshold. For example, the difference calculator 230 may calculate a ratio between the operational AE frequency information and the baseline AE frequency information, compare the ratio to a threshold, and determine whether the ratio satisfies a threshold (e.g., the ratio between power spectral peak amplitudes is greater than 5 dB, 10 dB, etc.). Alternatively, the difference calculator 230 may determine whether the operational AE frequency information satisfies a threshold (e.g., an amplitude of a power spectral peak is greater than 5 dB, 10 dB, etc.), the difference between adjusted AE sensor information and baseline AE sensor information satisfies a threshold (e.g., a voltage amplitude difference is greater than 0.5 V, 1.0 V, 1.5 V, etc.), etc.

If, at block 314, the example AEM 100 determines that the difference does not satisfy the threshold, control returns to block 302 to obtain valve state information of the valve. If, at block 314, the example AEM 100 determines that the difference does satisfy the threshold, then, at block 316, the AEM 100 identifies a condition of the valve. For example, the condition identifier 260 may determine that the fluid flow control assembly 108 is exhibiting a cavitation condition, an open valve flow condition, a seat leakage condition, etc.

At block 318, the example AEM 100 generates an alert. For example, the alert generator 270 may generate an alert including the identification of the condition of the fluid flow control assembly 108. At block 320, the example AEM 100 determines whether to continue monitoring the valve. For example, the collection engine 200 may determine whether to continue monitoring the fluid flow control assembly 108. If, at block 320, the example AEM 100 determines to continue monitoring the valve, control returns to block 302 to obtain valve state information of the valve, otherwise the example method 300 concludes.

Figure 4:
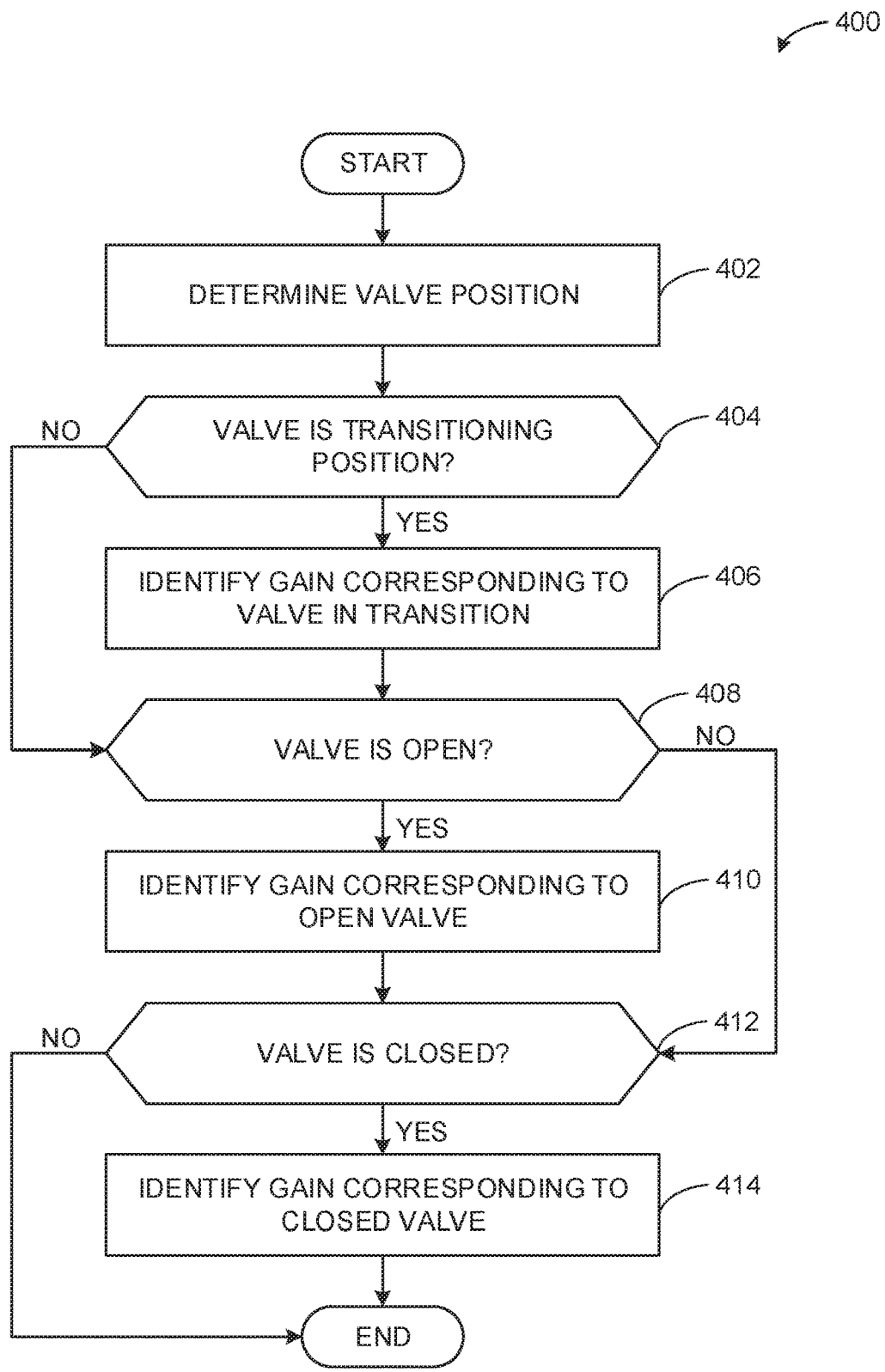

Additional detail in connection with determining a gain (FIG. 3 block 304) is shown in FIG. 4. FIG. 4 is a flowchart representative of an example method 400 that may be performed by the example AEM 100 of FIGS. 1-2 to determine a gain of a pre-amplifier. The example method 400 begins at block 402 when the example AEM 100 determines a valve position. For example, the collection engine 200 may determine a valve position percentage of a valve (e.g., the valve 112 is 100% open) from the valve state information.

At block 404, the example AEM 100 determines whether the valve is in a transitioning position. For example, the collection engine 200 may determine that the valve position of the valve 112 does not satisfy a threshold for either an open valve condition (e.g., the valve position of the valve 112 is greater than 99% open) or a closed valve condition (e.g., the valve position of the valve 112 is greater than 99% closed). If, at block 404, the example AEM 100 determines that the valve is not in a transitioning position, control proceeds to block 408 to determine whether the valve is open. If, at block 404, the example AEM 100 determines that the valve is in a transitioning position, then, at block 406, the AEM 100 identifies a gain corresponding to a valve in transition. For example, the selector 220 may map the valve position of the valve 112 to a gain value (e.g., a transition valve condition gain value) corresponding to a transition valve condition or position in a look-up table. The selector 220 may retrieve the gain value from the database 210.

At block 408, the example AEM 100 determines whether the valve is open. For example, the collection engine 200 may determine that the valve 112 is substantially open based on the valve position of the valve 112 satisfying an open valve condition (e.g., the valve position of the valve 112 is greater than 99% open). If, at block 408, the example AEM 100 determines that the valve is not open, control proceeds to block 412 to determine whether the valve is closed. If, at block 408, the example AEM 100 determines that the valve is open, then, at block 410, the AEM 100 identifies a gain corresponding to an open valve. For example, the selector 220 may map the valve 112 being substantially open to a gain value (e.g., an open valve gain value) corresponding to an open valve condition or position in a look-up table. The selector 220 may retrieve the gain value from the database 210.

At block 412, the example AEM 100 determines whether the valve is closed. For example, the collection engine 200 may determine that the valve position of the valve 112 is substantially closed based on the valve position satisfying a closed valve condition (e.g., the valve position of the valve 112 is greater than 99% closed). If, at block 412, the example AEM 100 determines that the valve is closed, then, at block 414, the AEM 100 identifies a gain corresponding to a closed valve. For example, the selector 220 may map the valve 112 being substantially closed to a gain value (e.g., a closed valve gain value) corresponding to a closed valve condition or position in a look-up table. The selector 220 may retrieve the gain value from the database 210. If, at block 412, the example AEM 100 determines that the valve is not closed, then the example method 400 concludes.

Figure 5:
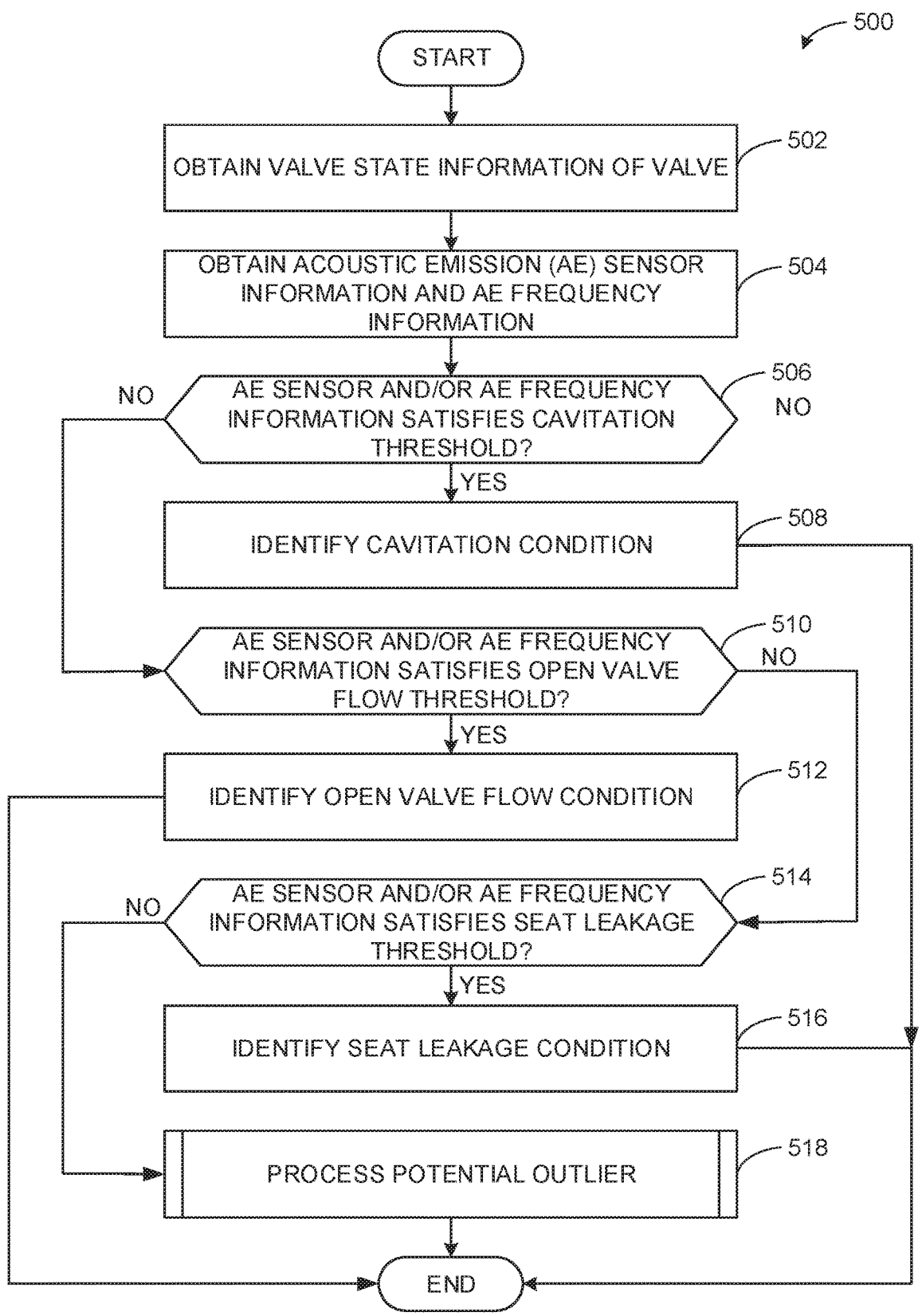

Additional detail in connection with identifying a condition of the valve (FIG. 3 block 316) is shown in FIG. 5. FIG. 5 is a flowchart representative of an example method 500 that may be performed by the example AEM 100 of FIGS. 1-2 to identify a condition of the fluid flow control assembly 108 of FIG. 1. The example method 500 begins at block 502 when the example AEM 100 obtains valve state information of a valve. For example, the collection engine 200 may obtain a valve position of the valve 112 of FIG. 1 from the field device 104 of FIG. 1, the database 210 of FIG. 2, etc.

At block 504, the example AEM 100 obtains Acoustic Emission (AE) sensor information and AE frequency information. For example, the collection engine 200 may obtain adjusted AE sensor information from the pre-amplifier 122 of FIGS. 1-2, from the database 210, etc. In another example, the collection engine 200 may obtain operational AE frequency information from the database 210 or by performing a frequency analysis calculation (e.g., an FFT, a power spectral density calculation, etc.) on the obtained adjusted AE sensor information.

At block 506, the example AEM 100 determines whether the AE sensor information and/or the AE frequency information satisfies a cavitation threshold. For example, the condition identifier 260 may determine that a voltage amplitude obtained from the pre-amplifier 122 at the valve position satisfies a cavitation threshold (e.g., a voltage amplitude output greater than 0.5 V, 1.0 V, 1.5 V, etc.). In another example, the condition identifier 260 may determine that an amplitude of a power spectral peak at a frequency satisfies a cavitation threshold (e.g., an amplitude of a power spectral peak at 800 kHz is greater than 110 $dB_{AE}$, 120 $dB_{AE}$, 130 $dB_{AE}$, etc.).

If, at block 506, the example AEM 100 determines that the AE sensor information and/or the AE frequency information does not satisfy the cavitation threshold, control proceeds to block 510 to determine whether the AE sensor information and/or the AE frequency information satisfies an open valve flow threshold. If, at block 506, the example AEM 100 determines that the AE sensor information and/or the AE frequency information does satisfy the cavitation threshold, then, at block 508, the AEM 100 identifies a cavitation condition. For example, the condition identifier 260 may identify that the fluid flow control assembly 108 is exhibiting a cavitation condition. In response to the example AEM 100 identifying a cavitation condition, the example method 500 concludes.

At block 510, the example AEM 100 determines whether the AE sensor information and/or the AE frequency information satisfies an open valve flow threshold. For example, the condition identifier 260 may determine that a voltage amplitude obtained from the pre-amplifier 122 at the valve position satisfies an open valve flow threshold (e.g., a voltage amplitude output greater than 0.5 V, 1.0 V, 1.5 V, etc.). In another example, the condition identifier 260 may determine that an amplitude of a power spectral peak at a frequency satisfies an open valve flow threshold (e.g., an amplitude of a power spectral peak at 500 kHz is greater than 95 dB$_{AE}$, 105 dB$_{AE}$, 115 dB$_{AE}$, etc.).

If, at block 510, the example AEM 100 determines that the AE sensor information and/or the AE frequency information does not satisfy the open valve flow threshold, control proceeds to block 514 to determine whether the AE sensor and/or the AE frequency information satisfies a seat leakage threshold. If, at block 510, the example AEM 100 determines that the AE sensor information and/or the AE frequency information does satisfy the open valve flow threshold, then, at block 512, the AEM 100 identifies an open valve flow condition. For example, the condition identifier 260 may identify that the fluid flow control assembly 108 is exhibiting an open valve flow condition. In response to the example AEM 100 identifying an open valve flow condition, the example method 500 concludes.

At block 514, the example AEM 100 determines whether the AE sensor information and/or the AE frequency information satisfies a seat leakage threshold. For example, the condition identifier 260 may determine that a voltage amplitude obtained from the pre-amplifier 122 at the valve position satisfies a seat leakage threshold (e.g., a voltage amplitude output greater than 0.5 V, 1.0 V, 1.5 V, etc.). In another example, the condition identifier 260 may determine that an amplitude of a power spectral peak at a frequency satisfies a seat leakage threshold (e.g., an amplitude of a power spectral peak at 300 kHz is greater than 45 dB$_{AE}$, 55 dB$_{AE}$, 65 dB$_{AE}$, etc.).

If, at block 514, the example AEM 100 determines that the AE sensor information and/or the AE frequency information does not satisfy the seat leakage threshold, control proceeds to block 518 to process a potential outlier. For example, the outlier identifier 250 may process the potential outlier. If, at block 514, the example AEM 100 determines that the AE sensor information and/or the AE frequency information does satisfy the seat leakage threshold, then, at block 516, the AEM 100 identifies a seat leakage condition. For example, the condition identifier 260 may identify that the fluid flow control assembly 108 is exhibiting a seat leakage condition. The example method 500 concludes after identifying the seat leakage condition at block 516 or processing the potential outlier at block 518.

Figure 6:
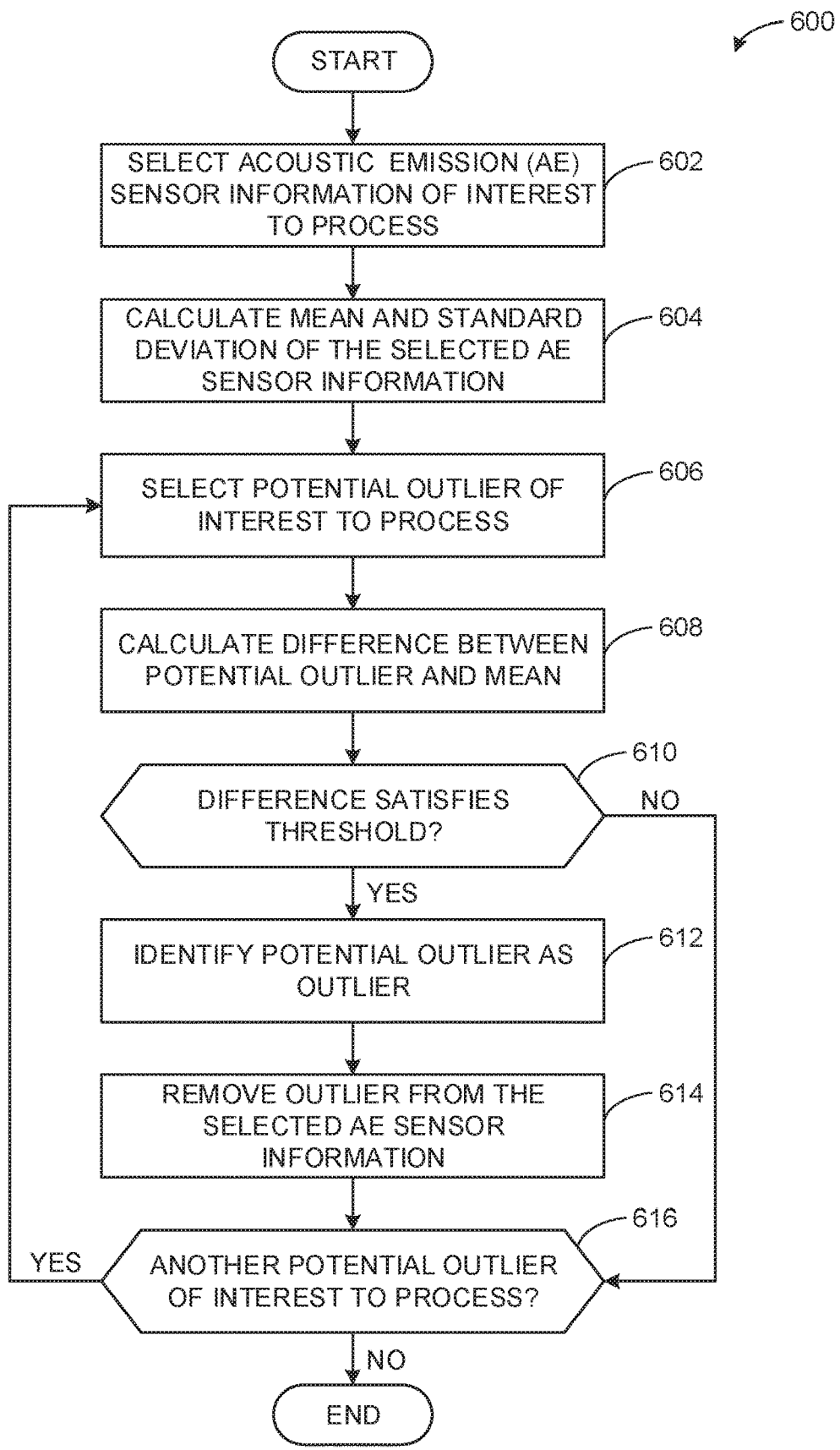

Additional detail in connection with processing a potential outlier (FIG. 5 block 518) is shown in FIG. 6. FIG. 6 is a flowchart representative of an example method 600 that may be performed by the example AEM 100 of FIG. 2 to process a potential outlier. The example method 600 begins at block 602 when the example AEM 100 selects acoustic emission (AE) sensor information of interest to process. For example, the collection engine 200 may select baseline AE sensor information, operational AE sensor information, etc., for a specified time interval to process. Additionally or alternatively, the outlier identifier 250 may select AE sensor information obtained from one or more valves coupled to a fluid process system external to the fluid process system 116, etc.

At block 604, the example AEM 100 calculates a mean and a standard deviation of the selected AE sensor information. For example, the outlier identifier 250 may calculate a mean value and a standard deviation value based on the selected baseline AE sensor information, the selected operational AE sensor information, etc.

At block 606, the example AEM 100 selects a potential outlier of interest to process. For example, the outlier identifier 250 may select a data point (e.g., a voltage amplitude of an output of the pre-amplifier 122 of FIGS. 1-2) within the selected AE sensor information to process. At block 608, the example AEM 100 calculates a difference between the potential outlier and the mean. For example, the outlier identifier 250 may calculate the difference between the data point and the mean value. At block 610, the example AEM 100 determines whether the difference satisfies a threshold. For example, the outlier identifier 250 may determine whether the difference satisfies the threshold (e.g., the difference is greater than one standard deviation value).

In some examples, user input determines the threshold. In some instances, the threshold is based on one or more standard deviation values. Additionally or alternatively, the threshold may be generated (e.g., adjusted, created, modified, etc.) based on the selected AE sensor information and/or previously obtained AE sensor information for the fluid flow control assembly 108. Alternatively, the threshold may be generated based on AE sensor information obtained from another sensor coupled to another fluid flow control assembly.

If, at block 610, the example AEM 100 determines that the difference does not satisfy the threshold, control proceeds to block 616 to determine whether there is another potential outlier of interest to process. If, at block 610, the example AEM 100 determines that the difference does satisfy the threshold, then, at block 612, the example AEM 100 identifies the potential outlier as an outlier. For example, the outlier identifier 250 may identify the data point of interest as an outlier.

At block 614, the example AEM 100 removes the outlier from the selected AE sensor information. For example, the outlier identifier 250 may remove the data point of interest from the selected AE sensor information. Alternatively, the outlier identifier 250 may store the outlier in the database 210 for further analysis and/or for generation of an alert. At block 616, the example AEM 100 determines whether there is another potential outlier of interest to process. For example, the outlier identifier 250 may determine whether there is another data point of interest to process. If, at block 616, the example AEM 100 determines there is another potential outlier of interest to process, control returns to block 606 to select another potential outlier of interest to process. If, at block 616, the example AEM 100 determines that there is not another potential outlier of interest to process (e.g., the database 210 returns a null index, etc.), then, the example method 600 concludes.

FIG. 7 is an example table 700 depicting example active acoustic emission (AE) sources that may be detected by the example AEM 100 of FIGS. 1-2 via the sensor 120 and the pre-amplifier 122 of FIGS. 1-2. In the illustrated example, the AEM 100 can detect multiple example active AE sources using the sensor 120 based on a leak, an open valve flow, cavitation damage, and valve damage. In the example table 700, the example AEM 100 can monitor an active source based on a leak when the obtained valve state of the fluid flow control assembly 108 of FIG. 1 is closed. In the example table 700, the example AEM 100 can monitor an active source based on an open valve flow when the obtained valve state of the fluid flow control assembly 108 is open. In the example table 700, the example AEM 100 can monitor an active source based on cavitation damage when the obtained valve state of the fluid flow control assembly of 108 is open. In the example table 700, the example AEM 100 can monitor an active source based on valve damage (e.g., a valve with one or more broken components, etc.) when the obtained valve state of the fluid flow control assembly 108 is closed.

In the illustrated example of FIG. 7, the AEM 100 compensates for competing sources by adjusting a gain of the pre-amplifier 122. For example, the AEM 100 may increase a gain of the pre-amplifier 122 to compensate for plant noise when the sensor 120 is monitoring for an active source based on a leak. In another example, the AEM 100 may decrease a gain of the pre-amplifier 122 to compensate for plant noise when the sensor 120 is monitoring for an active source based on open valve flow. In yet another example, the AEM 100 may decrease a gain of the pre-amplifier 122 to compensate for plant noise and noise due to open valve flow when the sensor 120 is monitoring for an active source based on cavitation damage. As depicted in the illustrated example of FIG. 7, the AEM 100 can multi-purpose the sensor 120 to monitor for multiple active sources by adjusting a gain of the pre-amplifier 122 based on a valve state of the fluid flow control assembly 108.

Figure 8:
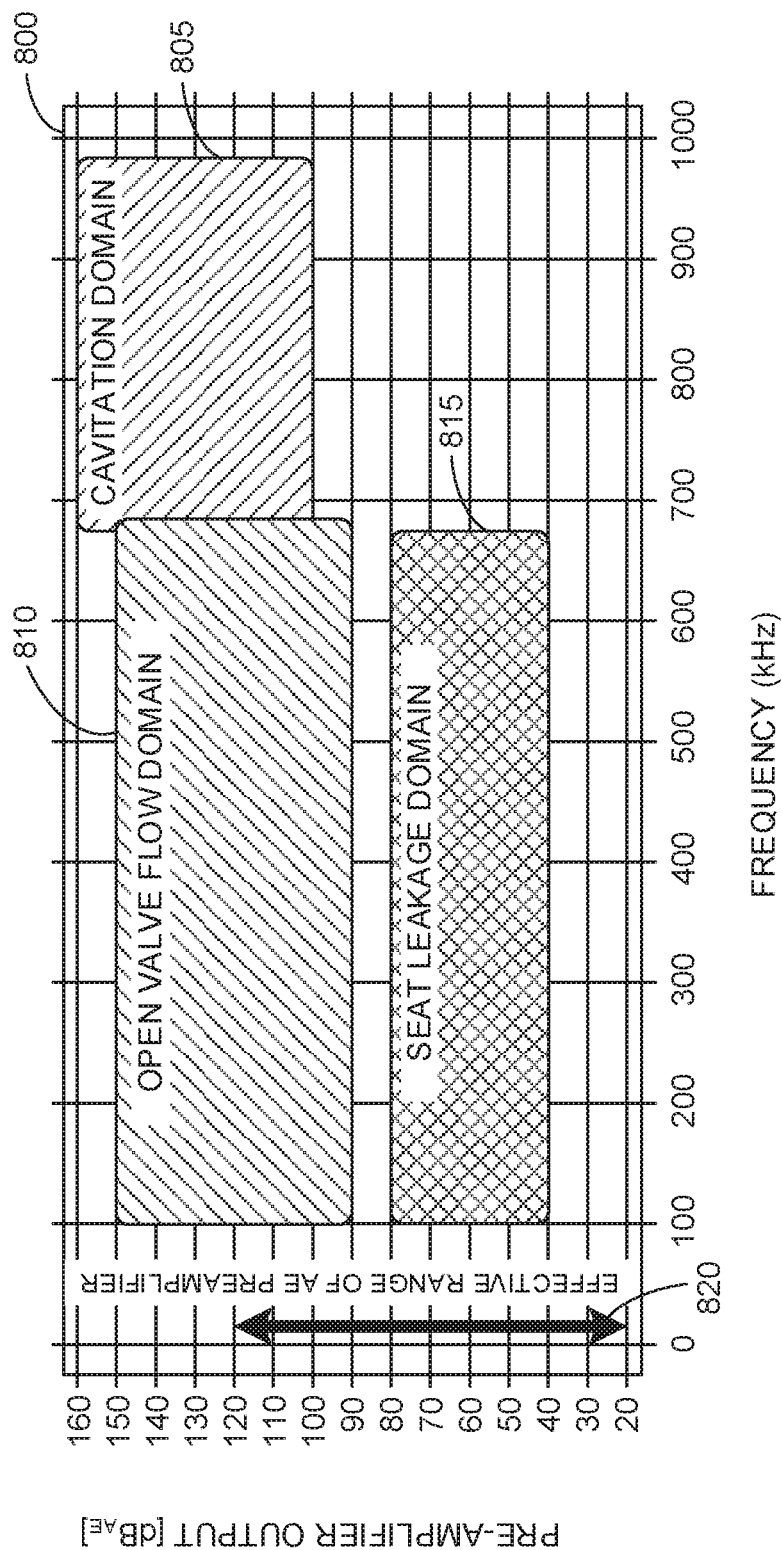
FIG. 8 is an example graph depicting example ranges for fluid flow control assembly condition domains.

FIG. 8 is a graph depicting ranges for example condition domains for the fluid flow control assembly 108 of FIG. 1. The graph of FIG. 8 depicts a plot 800 including example parameter ranges that may be used for identifying condition domains based on (1) an output of the pre-amplifier 122 of FIGS. 1-2 in acoustic emission decibels ($dB_{AE}$) and (2) a corresponding frequency in kilohertz (kHz) at which an amplitude of a voltage output of the pre-amplifier 122 occurs. The plot 800 illustrates an example cavitation domain 805, an example open valve flow domain 810, and an example seat leakage domain 815.

In the illustrated example, the cavitation domain 805 spans a frequency range of 675-975 kHz and spans a pre-amplifier output range of 100-160 $dB_{AE}$. For example, an amplitude of a voltage output of the pre-amplifier 122 in the range of 100-160 $dB_{AE}$ occurring at a frequency in the range of 675-975 kHz may correspond to the fluid flow control assembly 108 exhibiting a cavitation condition. For example, an amplitude of a voltage output of the pre-amplifier 122 of 110 $dB_{AE}$ occurring at a frequency of 800 kHz may correspond to a cavitation condition based on the voltage output satisfying a threshold (e.g., a voltage output greater than 0.5 V, 1.0 V, 1.5 V, etc.) and a position of the valve 112 being substantially open.

In the illustrated example, the open valve flow domain 810 spans a frequency range of 100-685 kHz and spans a pre-amplifier output range of 90-150 $dB_{AE}$. For example, an amplitude of a voltage output of the pre-amplifier 122 of 95 $dB_{AE}$ occurring at a frequency of 500 kHz may correspond to an open valve flow condition based on the voltage output satisfying a threshold (e.g., a voltage output greater than 0.5 V, 1.0 V, 1.5 V, etc.) and a position of the valve 112 being substantially open.

In the illustrated example, the seat leakage domain 815 spans a frequency range of 100-675 kHz and spans a pre-amplifier output range of 40-80 $dB_{AE}$. For example, an amplitude of a voltage output of the pre-amplifier 122 of 60 $dB_{AE}$ occurring at a frequency of 300 kHz may correspond to a seat leakage condition based on the voltage output satisfying a threshold (e.g., a voltage output greater than 0.5 V, 1.0 V, 1.5 V, etc.) and a position of the valve 112 being substantially closed.

In the illustrated example of FIG. 8, the plot 800 depicts an example effective range of an acoustic emission (AE) pre-amplifier 820. For example, the effective range 820 may correspond to a range of output values for the pre-amplifier 122 of FIGS. 1-2. In the illustrated example, the effective range 820 extends from 20-120 $dB_{AE}$. For example, the gain of the pre-amplifier 122 may be adjusted to produce an output in the range from 20-120 $dB_{AE}$ to amplify measurements from the sensor 120 corresponding to different condition domains. For example, the AEM 100 may determine to adjust the gain value of the pre-amplifier 122 to produce an output value in the seat leakage domain (e.g., an output value in the range from 40-80 $dB_{AE}$) when the valve 112 is substantially closed. In another example, the AEM 100 may determine to adjust the gain value of the pre-amplifier 122 to produce an output value in the open valve flow domain (e.g., an output value in the range from 90-150 $dB_{AE}$) when the valve 112 is substantially open. The example AEM 100 may adjust the gain value of the pre-amplifier 122 to monitor frequency responses across multiple condition domains. For example, the AEM 100 may adjust the gain value of the pre-amplifier 122 to produce an output value of 60 $dB_{AE}$ when the valve 112 is closed to monitor the seat leakage domain 815 and adjust the gain value to produce an output value of 95 $dB_{AE}$ when the valve 112 is open to monitor the cavitation domain 805 and/or the open valve flow domain 810.

In the illustrated example of FIG. 8, one AE sensor can be multi-purposed to monitor multiple condition domains. Instead of having a single sensor dedicated to measure a single condition domain, an appropriately chosen sensor (e.g., a low-fidelity broadband acoustic emission sensor, etc.) may be utilized to monitor multiple condition domains. For example, the AEM 100 may adjust a gain value of the pre-amplifier 122 to produce outputs based on AE sensor information corresponding to the cavitation domain 805, the open valve flow domain 810, and/or the seat leakage domain 815. The example AEM 100 may adjust the gain value of the pre-amplifier 122 to transition between the conditions domains based on a valve state (e.g., the valve 112 is open, the valve 112 is closed, etc.).

FIG. 9 is an example table 900 depicting example sensor output ranges for example condition domains for the fluid flow control assembly 108 of FIG. 1. The table 900 depicts a sensor output range column 905, a sensor output range in acoustic emission (AE) scale ($dB_{AE}$) column 910, an AE range for seat leakage detection column 915, an AE range for open flow detection column 920, and an AE range for cavitation detection column 925. In the illustrated example, the sensor output range column 905 corresponds to amplitudes of voltage outputs of the sensor 120 of FIGS. 1-2. In the illustrated example, the sensor output range in AE scale column 910 corresponds to the values in the sensor output amplitude column 905 converted to $dB_{AE}$. For example, a sensor output range of one millivolt to ten millivolts can be entered into Equation (2) above to yield a sensor output range in AE scale of 40-60 $dB_{AE}$.

In the illustrated example of FIG. 9, the AE range for seat leakage detection column 915 corresponds to example amplitudes of voltage outputs of the sensor 120 that may satisfy a threshold indicating that the fluid flow control assembly 108 is exhibiting a seat leakage condition. In the illustrated example, amplitudes ranging from three microvolts to 100 millivolts may satisfy a threshold (e.g., an amplitude of 100 microvolts is greater than a threshold of 50 microvolts, an amplitude of 100 microvolts at 300 kHz is greater than a threshold of 50 microvolts at 300 kHz, etc.). In some examples, the AEM 100 determines that a sensor output in AE scale indicates replacement of the fluid flow control assembly 108. For example, the AEM 100 may determine that a sensor output from a range of 60-100 dB$_{AE}$ indicates replacement.

In the illustrated example of FIG. 9, the open valve flow condition domain column 920 corresponds to example amplitudes of voltage outputs of the sensor 120 that may satisfy a threshold indicating that the fluid flow control assembly 108 is exhibiting an open valve flow condition. In the illustrated example, amplitudes ranging from 100 microvolts to 10 volts may satisfy a threshold (e.g., an amplitude of 1 V is greater than a threshold of 100 millivolts, an amplitude of 1 V at 500 kHz is greater than a threshold of 100 millivolts at 500 kHz, etc.). Similarly, the cavitation condition domain column 925 corresponds to example amplitudes of voltage outputs of the sensor 120 that may satisfy a threshold indicating that the fluid flow control assembly 108 is exhibiting a cavitation condition.

In the illustrated example of FIG. 9, although the sensor output amplitude ranges overlap across the different condition domains, the AEM 100 may distinguish between the different condition domains based on valve state information. For example, a sensor output of 10 millivolts is applicable to both the AE range for seat leakage detection column 915 and the open flow detection column 920. The example AEM 100 may determine that the valve 112 of FIG. 1 is substantially open, thus determining that the sensor output of 10 millivolts corresponds to the open flow detection column 820 and, thus, corresponds to an open valve flow condition domain. Additionally or alternatively, the example AEM 100 may utilize additional information included in the valve state information and/or in the information resulting from one or more digital processing techniques to determine an applicable condition domain for a sensor output and/or a pre-amplifier gain that is within a range of multiple condition domains.

Figure 10:
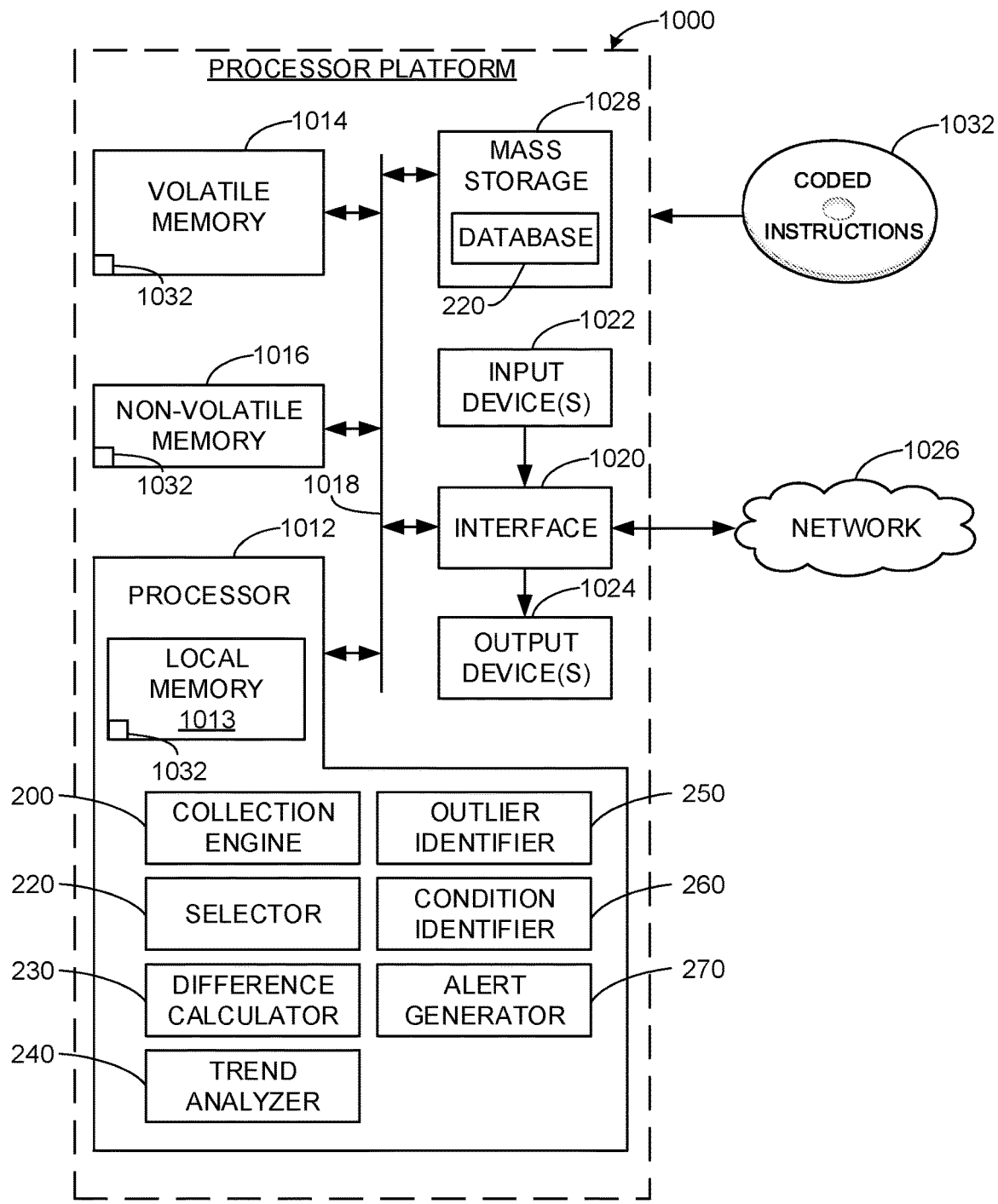
FIG. 10 is a block diagram of an example processor platform structured to execute machine readable instructions to implement the methods of FIGS. 3-6 and/or the example acoustic emission manager apparatus of FIGS. 1-2.

FIG. 10 is a block diagram of an example processor platform 1000 capable of executing instructions to implement the methods of FIGS. 3-6 and the example AEM 100 of FIGS. 1-2. The processor platform 1000 can be, for example, a data acquisition system, a programmable logic controller, a server, a personal computer, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer. The hardware processor may be a semiconductor based (e.g., silicon based) device. In this example, the processor 1012 implements the example collection engine 200, the example selector 220, the example difference calculator 230, the example trend analyzer 240, the example outlier identifier 250, the example condition identifier 260, and the example alert generator 270.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball, isopoint, and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1020 of the illustrated example, thus, typically includes a graphics driver card, a graphics driver chip, or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 1000 of the illustrated example also includes one or more mass storage devices 1028 for storing software and/or data. Examples of such mass storage devices 1028 include floppy disk drives, hard drive disks, magnetic media, solid-state drives, compact disk drives, Blu-ray disk drives, RAID systems, and digital versatile disk (DVD) drives. The example mass storage 1028 implements the example database 210.

Coded instructions 1032 to implement the methods represented by the flowcharts of FIGS. 3-6 may be stored in the mass storage device 1028, in the volatile memory 1014, in the non-volatile memory 1016, and/or on a removable tangible computer readable storage medium such as a CD or DVD.

From the foregoing, it will be appreciated that the above disclosed apparatus, methods, and articles of manufacture enable multi-purposing of an acoustic emission sensor. By multi-purposing the acoustic emission sensor, a single sensor can monitor a fluid flow control assembly across multiple condition domains. Thus, a reduction of sensors and sensor-related hardware is realized. Also, an identification of the condition domain of the fluid flow control assembly generates an alert to personnel to allow the performance of preventative maintenance and/or replacement of the fluid flow control assembly prior to a potential failure that may produce unwanted downtime in a process control environment.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus configured to be coupled to an acoustic emission sensor, the acoustic emission sensor to be coupled to a fluid flow control assembly, the apparatus comprising:
   a collection engine configured to:
      obtain a measurement from the acoustic emissions sensor; and
      obtain a state of the fluid flow control assembly;
   a selector to adjust a gain of a pre-amplifier based on the state to adjust the measurement; and
   a condition identifier to identify a condition of the fluid flow control assembly based on the adjusted measurement.

2. The apparatus of claim 1, wherein the acoustic emissions sensor is a hybrid broadband-high sensitivity sensor, and the collection engine is further configured to obtain, from the hybrid broadband-high sensitivity sensor, a plurality of measurements including the measurement to monitor multiple active sources associated with the fluid flow control assembly.

3. The apparatus of claim 1, wherein the selector is to adjust the gain based on a determination of at least one of an amplification band or a frequency band.

4. The apparatus of claim 1, wherein the state includes an open percentage or a closed percentage associated with the fluid flow control assembly.

5. The apparatus of claim 1, wherein the collection engine is to obtain the state from the fluid flow control assembly.

6. The apparatus of claim 1, wherein the condition includes at least one of a cavitation, a leak, or an open flow of the fluid flow control assembly.

7. The apparatus of claim 1, wherein the measurement is a first measurement, and the collection engine is to:
   calculate an average signal level based on the first measurement;
   determine a floating threshold based on the average signal level and a fixed threshold; and
   obtain the adjusted measurement based on the floating threshold.

8. A method comprising:
   obtaining an operational measurement from an acoustic emissions sensor coupled to a fluid flow control assembly;
   obtaining a state of the fluid flow control assembly;
   adjusting a gain of a pre-amplifier based on the state to adjust the operational measurement; and
   identifying a condition of the fluid flow control assembly based on the adjusted operational measurement.

9. The method of claim 8, wherein the acoustic emissions sensor is a hybrid broadband-high sensitivity sensor configured to monitor multiple active sources associated with the fluid flow control assembly, and the operational measurement is from the hybrid broadband-high sensitivity sensor.

10. The method of claim 8, wherein adjusting the gain is based on a determination of at least one of an amplification band or a frequency band.

11. The method of claim 8, wherein the state includes an open percentage or a closed percentage of the fluid flow control assembly.

12. The method of claim 8, further including calculating a difference between the adjusted operational measurement and a baseline measurement and identifying the condition based on whether the difference satisfies a threshold.

13. The method of claim 12, further including generating an alert when the difference satisfies the threshold.

14. The method of claim 8, wherein the condition includes at least one of a cavitation, a leak, or an open flow of the fluid flow control assembly.

15. The method of claim 8, wherein obtaining the adjusted operational measurement includes:
   calculating an average signal level based on the operational measurement;
   determining a floating threshold based on the average signal level and a fixed threshold; and
   obtaining the adjusted operational measurement based on the floating threshold.

16. A non-transitory computer readable storage medium comprising instructions that, when executed, cause a machine to at least:
   obtain an operational measurement from an acoustic emissions sensor coupled to a fluid flow control assembly;
   obtain a state of the fluid flow control assembly;
   adjust a gain of a pre-amplifier based on the state to adjust the operational measurement; and
   identify a condition of the fluid flow control assembly based on the adjusted operational measurement.

17. The non-transitory computer readable storage medium of claim 16, wherein the acoustic emissions sensor is a hybrid broadband-high sensitivity sensor, and the instructions, when executed, cause the machine to obtain, from the hybrid broadband-high sensitivity sensor, a plurality of operational measurements including the operational measurement to monitor multiple active sources associated with the fluid flow control assembly.

18. The non-transitory computer readable storage medium of claim 16, wherein the instructions, when executed, cause the machine to adjust the gain based on a determination of at least one of an amplification band or a frequency band.

19. The non-transitory computer readable storage medium of claim 16, wherein the state includes an open percentage or a closed percentage of the fluid flow control assembly.

20. The non-transitory computer readable storage medium of claim 16, wherein the instructions, when executed, cause the machine to calculate a difference between the adjusted operational measurement and a baseline measurement and identify the condition based on whether the difference satisfies a threshold.

21. The non-transitory computer readable storage medium of claim 20, wherein the instructions, when executed, cause the machine to generate an alert when the difference satisfies the threshold.

22. The non-transitory computer readable storage medium of claim 16, wherein the condition of the fluid flow control assembly is at least one of a cavitation, a leak, or an open flow of the fluid flow control assembly.

23. The non-transitory computer readable storage medium of claim 16, wherein the instructions, when executed, cause the machine to:
   calculate an average signal level based on the operational measurement;
   determine a floating threshold based on the average signal level and a fixed threshold; and
   obtain the adjusted operational measurement based on the floating threshold.

* * * * *